United States Patent
Naderi et al.

(10) Patent No.: US 11,485,494 B2
(45) Date of Patent: Nov. 1, 2022

(54) WIRELESS CHARGING OF UNMANNED AERIAL VEHICLES

(71) Applicant: Northeastern University, Boston, MA (US)

(72) Inventors: Yousof Naderi, Brookline, MA (US); Kaushik Chowdhury, Needham, MA (US)

(73) Assignee: Northeastern University, Boston, MA (US)

( * ) Notice: Subject to any disclaimer, the term of this patent is extended or adjusted under 35 U.S.C. 154(b) by 133 days.

(21) Appl. No.: 17/062,465

(22) Filed: Oct. 2, 2020

(65) Prior Publication Data
US 2021/0101680 A1    Apr. 8, 2021

Related U.S. Application Data

(60) Provisional application No. 62/943,870, filed on Dec. 5, 2019, provisional application No. 62/910,613, filed on Oct. 4, 2019.

(51) Int. Cl.
*H02J 7/00*     (2006.01)
*B64C 39/02*    (2006.01)
(Continued)

(52) U.S. Cl.
CPC ............ *B64C 39/024* (2013.01); *H02J 50/12* (2016.02); *H02J 50/402* (2020.01); *H02J 50/90* (2016.02);
(Continued)

(58) Field of Classification Search
None
See application file for complete search history.

(56) References Cited

U.S. PATENT DOCUMENTS 8,164,222 B2    4/2012   Baarman
8,511,606 B1 *  8/2013   Lutke ................... B64C 39/024
                                                    320/109
(Continued)

FOREIGN PATENT DOCUMENTS

WO    2018111603 A1    6/2018
WO    2018229494 A1    12/2018

OTHER PUBLICATIONS

Tesla, N. "The transmission of electric energy without wires," Electr. World Eng, vol. 5, pp. 1-4, 1904.
(Continued)

*Primary Examiner* — Arun C Williams
(74) *Attorney, Agent, or Firm* — Verrill Dana, LLP

(57) ABSTRACT

The presently disclosed embodiments generally relate to systems, devices, and methods for sensing and charging of electronic devices using coils. In some embodiments, the presently disclosed system can include a pad, a charging foot, and a backpack. The pad can include one or more nested coils therein that can sense one or more corresponding receiver coils of an unmanned aerial vehicles (UAV) that landed thereon. The nested coils of the pad can provide charging energy to the UAV independent of the location along the pad in which the UAV landed, and no precise alignment between the receiver coils and the charging coils is required. The charging foot can be attached to one or more legs of the UAV, and can include a receiver coil and circuitry to regulate energy received by the coil to a charging voltage level that can be provided to the battery.

20 Claims, 30 Drawing Sheets

(51) Int. Cl.
H02J 50/12 (2016.01)
H02J 50/40 (2016.01)
H02J 50/90 (2016.01)
(52) U.S. Cl.
CPC .. B64C 2201/042 (2013.01); B64C 2201/141 (2013.01); H02J 2310/44 (2020.01)

(56) References Cited

U.S. PATENT DOCUMENTS

| | | | |
|---|---|---|---|
| 8,890,472 | B2 | 11/2014 | Mashinsky |
| 10,007,272 | B2* | 6/2018 | Tirpak ................... G05D 1/042 |
| 10,236,725 | B1 | 3/2019 | Shahsavari et al. |
| 2006/0044212 | A1 | 3/2006 | Wang et al. |
| 2010/0164296 | A1 | 7/2010 | Kurs et al. |
| 2011/0074349 | A1 | 3/2011 | Ghovanloo |
| 2014/0211298 | A1 | 7/2014 | Sayyah et al. |
| 2016/0134154 | A1 | 5/2016 | Baarman et al. |
| 2016/0336803 | A1 | 11/2016 | Kurs et al. |
| 2016/0336809 | A1 | 11/2016 | Gluzman et al. |
| 2018/0009527 | A1* | 1/2018 | Von Novak, III ... G08G 5/0013 |
| 2018/0074485 | A1* | 3/2018 | Krishnamoorthy .. G08G 5/0082 |
| 2018/0170538 | A1* | 6/2018 | Phipps .................. B64C 39/024 |
| 2018/0219421 | A1 | 8/2018 | Yang et al. |
| 2018/0366994 | A1 | 12/2018 | Meichle |
| 2019/0027298 | A1 | 1/2019 | Jadidian et al. |
| 2019/0044491 | A1 | 2/2019 | Stevens et al. |
| 2019/0229561 | A1 | 7/2019 | Vocke et al. |

OTHER PUBLICATIONS

Wireless Power Consortium "Qi-mobile computing", 2018, 3 pages, Retrieved from www.wirelesspowerconsortium.com/qi.
AirFuel Alliance "Airfuel resonant specification," 2014, 5 pages, Retrieved from www.airfuel.org/.
Lukic et al., "Cutting the Cord: Static and dynamic inductive wireless charging of electric vehicles," IEEE Electrification Magazine, vol. 1, No. 1, pp. 57-64, 2013.
Madawala et al., "A Bidirectional Inductive Power Interface for Electric Vehicles in V2g Systems," IEEE Trans on Indus Elec, vol. 58, No. 10, pp. 4789-4796, 2011.
Onar et al., "A Novel Wireless Power Transfer for In-Motion EV/PHEV Charging," 2013 Twenty-Eighth Annual IEEE Applied Power Electronics Conference and Exposition (APEC) pp. 3073-3080.
Sun et al., "Performance Analysis of Dynamic Wireless Charging System for Electric Vehicles: A Queueing Approach," in Proceedings of the Eighth International Conference on Future Energy Systems, 2017, pp. 168-178.
Aldhaher et al., "Light-Weight Wireless Power Transfer for Mid-Air Charging of Drones," in 2017 11th European Conference on Antennas and Propagation (EUCAP), 2017, pp. 336-340.
Choi et al., "Automatic Wireless Drone Charging Station—Creating Essential Environment for Continuous Drone Operation," in IEEE ICCAIS, 2016, pp. 132-136.
Li et al., "QiLoc: A Qi Wireless Charging Based System for Robust User-Initiated Indoor Location Services," 2015 12 Annual IEEE International Conference on Sensing, Communication, and Networking (SECON), pp. 480-488, 2015.

Jadidian et al., "Magnetic MIMO: How to Charge Your Phone in Your Pocket," in ACM MobiCom, 2014, pp. 495-506.
Kurs et al., "Wireless Power Transfer via Strongly Coupled Magnetic Resonances," Science, vol. 317, Jul. 6, 2007, pp. 83-86.
Shi et al., "Wireless Power Hotspot That Charges All of Your Devices," in ACM MobiCom, 2015, pp. 2-13.
Zhong et al., "General Analysis on the Use of Tesla's Resonators in Domino Forms for Wireless Power Transfer," IEEE Tran on Indus Elec, vol. 60, No. 1, pp. 261-270, 2013.
Lee et al., "Effects of Magnetic Coupling of Nonadjacent Resonators on Wireless Power Domino-Resonator Systems," IEEE Tran on Power Elec, vol. 27, No. 4, pp. 1905-1916, 2012.
Stevens, Christopher J., "Magnetoinductive Waves and Wireless Power Transfer," IEEE Tran on Power Elec, vol. 30, No. 11, pp. 6182-6190, 2015.
Wang et al., "Wireless Power Transfer: Metamaterials and Array of Coupled Resonators," Proceedings of the IEEE, vol. 101, No. 6, pp. 1359-1368, 2013.
Shi et al., "Large Area Wireless Power via a Planar Array of Coupled Resonators," in 2016 International Workshop on Antenna Technology (iWAT), 2016, pp. 200-203.
Waters et al., "Simultaneously Tuning and Powering Multiple Wirelessly Powered Devices," in 2015 IEEE Wireless Power Transfer Conference (WPTC). IEEE, 2015, pp. 1-4.
Xiong et al., "Arraytrack: A Fine-Grained Indoor Location System" in 10th USENIX Symposium on (NSDI 13), Lombard, IL, 2013, pp. 71-84.
Bharadia et al., "Backfi: High Throughput WiFi Backscatter," ACM SIGCOMM Computer Comm. Review, vol. 45, No. 4, pp. 283-296, 2015.
Ha et al., "Learning Food Quality and Safety from Wireless Stickers," in Proceedings of the 17th ACM Workshop on Hot Topics in Networks. ACM, 2018, pp. 106-112.
Luo et al., "3d backscatter Localization for Fine-Grained Robotics," in 16th USENIX Symposium on (NSDI 19), Boston, MA, 2019, pp. 765-782.
Nandakumar et al., "33D Localization for Sub-Centimeter Sized Devices," in Proceedings of the 16th ACM Conference on Embedded Networked Sensor Systems. ACM, 2018, pp. 108-119.
Niyato et al., "Wireless Powered Communication Networks: Research Directions and Technological Approaches," IEEE Wireless Communications, vol. 24, No. 6, pp. 88-97, 2017.
Sundeen et al., "Thermal sensor properties of cermet resistor films on silicon substrates," Sensors and Actuators A: Physical, vol. 90, No. 1-2, pp. 118-124, 2001.
Zhang et al., "Electrick: Low-Cost Touch Sensing Using Electric Field tomography" in CHI Conference on Human Factors in Computing Systems. ACM, 2017, pp. 1 14.
Chuo et al.,"RF-Echo: A Non-Line-of-Sight Indoor Localization System Using a Low-Power Active RF Reflector ASIC Tag," in Proceedings of MobiCom 2017, pp. 222-234.
Haus, Herman A., "Waves and Felds in Optoelectronics", Prentice-Hall, 1984, 415 pages.
Neath et al., "Controller Synthesis of a Bidirectional Inductive Power Interface for Electric Vehicles," IEEE ICET 2012, Nepal, pp. 60-65.
Kurs et al., "Supporting Online Material for Wireless Power Transfer via Strongly Coupled Magnetic Resonances," Science, vol. 317, No. 5834, 2007, pp. 1-7.

* cited by examiner

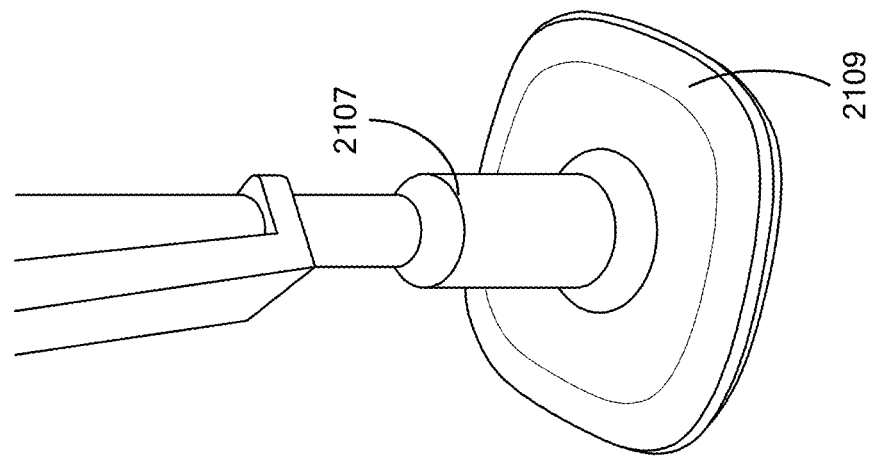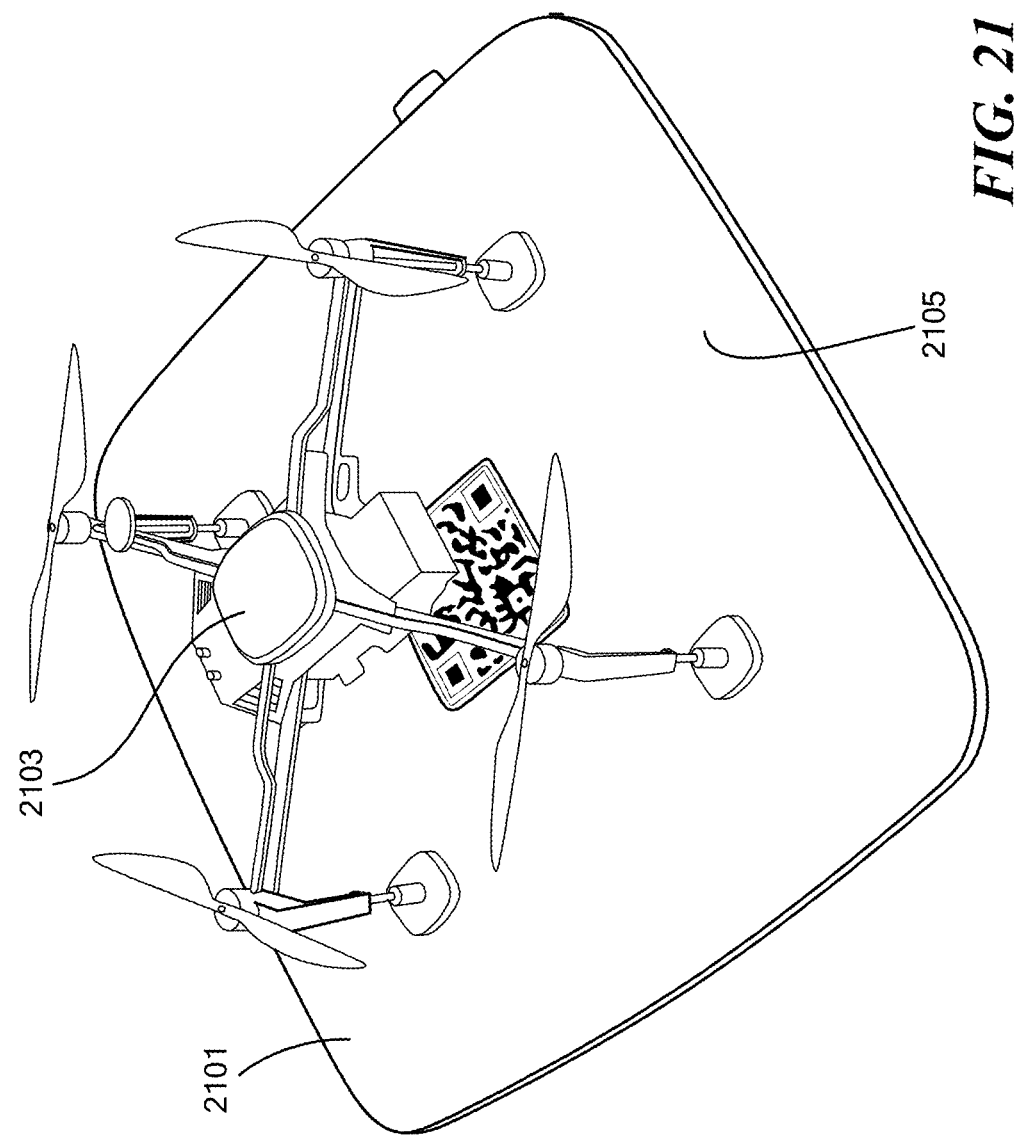
FIG. 21

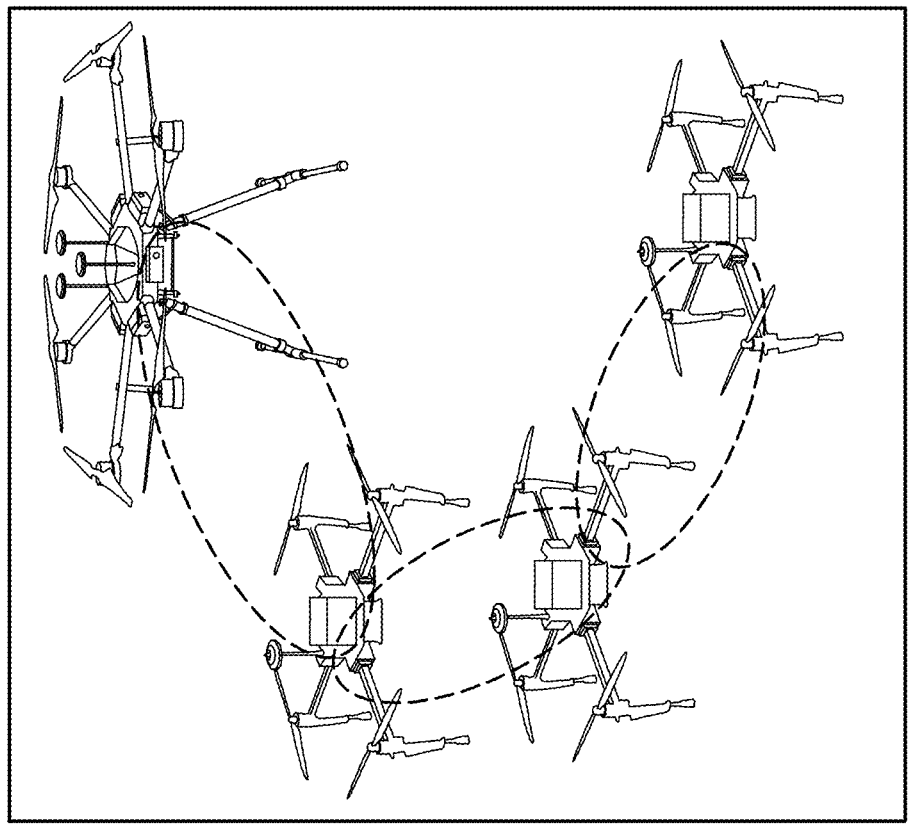
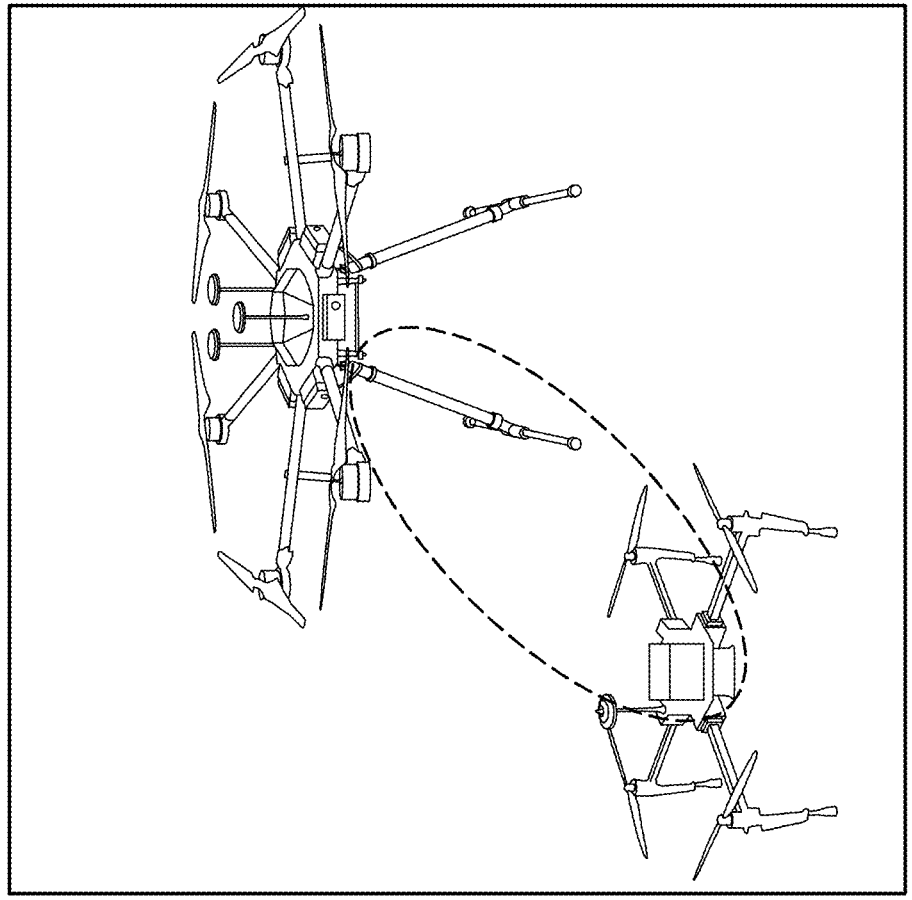
FIG. 26

WIRELESS CHARGING OF UNMANNED AERIAL VEHICLES

RELATED APPLICATIONS

This application claims priority to and the benefit of U.S. Provisional Application No. 62/910,613, filed on Oct. 4, 2019, titled "Method and Apparatus for Software-Defined Cognitive Wireless Charging Network," and naming Kaushik Chowdhury and Yousof Naderi as inventors, and U.S. Provisional Application No. 62/943,870, filed on Dec. 5, 2019, titled "Method and Apparatus for Collaborative Device Sensing and Charging Using Networked Coils," and naming Kaushik Chowdhury and Yousof Naderi as inventors, the content of each of which is hereby incorporated by reference in its entirety.

STATEMENT REGARDING FEDERALLY SPONSORED RESEARCH OR DEVELOPMENT

This invention was made with government support under Grant Number 1701041 and Grant Number 1452628 awarded by the National Science Foundation. The government has certain rights in the invention.

FIELD OF THE INVENTION

The presently disclosed embodiments generally relate to sensing and charging of electronic devices using networked coils.

BACKGROUND

Wireless energy transfer to charge electronic devices has gained meaningful advancements over the last decade from efficiency improvements in radio frequency-based harvesting circuits, to more efficient gallium nitride (GaN)-based power amplifier, to standardization of inductive-based wireless charging technology (called "Qi") in smart phones, and to advanced beamforming energy transfer techniques. These advancements span from low power energy transfer capable of charging wearable devices and sensors, to medium-power for charging phones, tablets and laptops, and to high-power for charging electrical cars.

Wireless charging performance depends on multiple factors including technology (RF-based, magnetic induction, magnetic resonance, etc.) and frequency of energy transfer (KHz, MHz, GHz) which determine the maximum charging distance, efficiency of transfer, and maximum deliverable power. While RF-based energy transfer provides flexibility to transfer power over longer distances toward multiple receivers, the significant path loss and limitation of non-exceeding allowable power density in the environment make them most suitable for low-power charging scenarios such as sensors and wearables. On the other hand, magnetic induction and magnetic resonance-based energy transfer technologies provide shorter charging distances but higher deliverable power that make them suitable for medium and high-power charging scenarios such as phones and laptops.

Despite all the progress on the magnetic induction and resonance based wireless energy transfer, the existing charging solutions based on these two technologies are limited to (i) isolated coil-based transmitters that individually sense and charge devices that come over their charging range, and (ii) a group of few coils that are pre-connected and synchronized with each other in operation (e.g. three coil Qi-based inductive charging, synchronized multi-coils multi-amplifier magnetic resonance transfer over surface, vertical and horizontal synchronized coils inside one transmitter using magnetic resonance technology).

Localization and tracking solutions based on the reflected RF signals from technologies such as WiFi, Bluetooth, ZigBee, LoRa, and RFID have been extensively studied. However (i) multi-path reflections from the environment, (ii) need for a receiver device and/or additional signal reflectors, and (iii) complex and power consuming algorithms at the transmitter are the main shortcomings of these works.

Current technologies, including Qi-based magnetic induction, permit only few mm of alignment mismatch between the transmitter-receiver coils, and are effective at less than 5 mm gap between the transmitter-receiver coil. Moreover, to cover a large surface, hundreds of coils are needed, each with its own power management circuit per coil. This dramatically increases the cost and complexity of existing charging systems.

Additionally, this requires specialized power sockets to ensure that the hundreds of coils are continuously sensing, even when there are no devices to be charged.

Using classical strongly coupled magnetic resonance energy transfer overcomes the requirement of direct contact, although each coil now must have its own separate power amplifier, explicit receiver-generated feedback, phase adjustment circuits and inter-coil synchronization. Prior research has shown that such coupling can deliver power over 2 m distance with more than 40% efficiency.

A seminal advancement in this area leveraged the principle of MIMO-beamforming commonly used in classical RF communication to constructively combine magnetic field energy supplied by multiple resonance transmitters. Magnetic MIMO, analogous to the concept of MIMO in RF signals, uses six power amplifiers to deliver power to a phone through a table. This uses current change from each coil as the feedback to localize the position of a given phone and then controls the current of each amplifier to beamform the power to the receiver. While the receiver does not need perfect alignment with the transmitter, each coil needs one amplifier, which drives up cost. Second, the current feedback induced from the mutual coupling between transmitter and receiver prolongs sensing time. To ensure robustness in the feedback, the transmitter needs to be large and the mutual coupling strong enough to induce clear impedance change.

In the field of electric-powered unmanned aerial vehicles (UAVs), pain points are experienced both in the enterprise and consumer sectors. Automated charging of UAVs is an important market due to the limited flight-times available for battery-powered UAVs. Most UAVs can only fly for 20-30 mins at a time, which impacts practical operations due to the involved downtime. Furthermore, the need for human intervention for frequent charging is a major pain point. For example, wireless charging is difficult due to the requirement of existing technologies to precisely align the receiver coil with the charger, which is complicated to attain during landing of the UAV. In addition, the increasing use of COTS UAS within public safety agencies and DoD have raised flags on determining friendly versus adversarial hardware originating from the same company, as they offer the same radar signatures.

Accordingly, there is a need for systems, devices, and methods for extending the battery life of the UAVs while also providing more security that prevents hacking and other software-based takeovers thereof to improve the usability and applications of UAV technology.

SUMMARY

In certain embodiments, the presently disclosed systems and methods use the wireless sensing and charging techniques detailed below to locate multiple devices to be charged on a charging surface and then direct the charging energy to the specific locations where it is needed. Such capabilities are particularly useful automated UAV charging. Due to the limited flight-times available for battery-powered UAVs, automated charging of UAVs and especially UAV to UAV charging can significantly improve the usability and applications of UAV technology.

As noted, the device locating systems and methods described herein allow the determination of device locations and can provide charging energy without precise alignment. Building off of these abilities, certain aspects include UAV to UAV charging systems. For example, a swarm of UAVs may all include customized field programmable gate array (FPGA) hardware and one or more nested coils which may be implemented on a multi-layer printed circuit board (PCB) which may be adjustable on-the-fly to be aimed in different directions. This allows for real-time sensing of the relative positioning of the UAVs in the swarm and the battery of a UAV may be charged using energy hopping between UAVs. In certain embodiments, one or more of the UAVs in the swarm may be designed to carry a higher capacity battery than the other UAVs in the swarm and can provide energy to the other UAVs. The changes in resonance coupling between active pairs of UAVs may be used for on-the-fly positioning of the UAVs without the need for GPS. In some embodiments, kinetic energy from the propellers of the UAVs may be harvested and used to charge the battery of the UAV or to charge the battery of other UAVs by hopping from coil to coil on different UAVs.

In various embodiments, systems and methods may comprise a UAV landing pad that doubles as a wireless charging surface. The pad may be foldable to provide for easy portability with each half including multiple nested coils that are used both for the sensing of one or more receiver coils of the landed UAV and to provide charging energy to those receiver coils. This allows the UAV to be charged wherever it lands on the pad since no precise alignment between the receiver coils and the charging coils is required. The pad may include a controller that can communicate with each nested coil and determine the location of each wireless charging receiver (e.g. a charging foot as described below) and then direct the charging energy to follow a path to the closest nested coil, hopping though intermediate coils with very little energy loss.

While some applications may be able to adequately charge the UAV's battery through a single receiver coil on the UAV, in certain embodiments a UAV charging foot may be provided as a companion to the landing pad. The UAV charging foot can be a mechanical foot adapted to be positioned on one or more legs of the UAV. Each charging foot may comprise a receiver coil and circuitry to regulate energy received by the coil to a charging voltage level that can be provided to the battery of the UAV. Each landing leg of a UAV may be fitted with a charging foot which can thereby decrease the charging time of the battery of the UAV by providing multiple receiving points for a single UAV. In certain embodiments, the charging feet may draw power from a separate charging coil on the landing pad.

Another aspect of autonomous charging is authentication of the UAV to ensure that only authorized UAVs are able to utilize a specific charging pad. In certain embodiments, traditional authentication techniques such as passwords and cryptographically-signed tokens may be used. In preferred embodiments, RF fingerprinting technology is used to augment, or even replace, traditional authentication techniques. Each RF transmitter has unique characteristics due to manufacturing process variations. Charging pads or coils of the present embodiments may include an RF receiver operable to analyze the RF characteristics of the transmitter in an approaching UAV to identify the unit and determine charging permissions as well as charging characteristics (e.g., power requirements). In certain embodiments, charging pads may use machine learning-based algorithms to determine whether or not the UAV is authorized to use the charging pad based on its RF signal.

To be able to charge a device, it is important to know where the device is located. In the Qi standard, this is handled by requiring that the user place the device accurately on the charger. But to understand where multiple devices are located when they are arbitrarily placed within a charging space, a technological solution is required. While one solution might be to embed a beacon of some sort in each device, this won't work with existing Qi-enabled devices that were built without such a beacon. But any device will interact with a magnetic field and this interaction can be used to detect a device's location.

Systems and methods of the present embodiments measure the interaction of devices with a generated magnetic field through a network of nested sensing coils that can sense the location of devices located around the network of coils based on their interaction with magnetic fields. Specifically, multiple sensing nodes are used to detect the presence of the devices. Each sensing node includes an active coil nested inside of a larger passive coil. A controller is coupled to both coils and can drive an AC signal (with a frequency in the kHz or MHz range) into the active coil. The controller then measures the voltage from the passive coil which is magnetically coupled to the active coil.

The controllers of the modules are in communication with a central system controller and report the detected voltage to the central system controller which then analyzes the measurement data to determine where the device, or devices, are located. The analyzing can be done by comparing the set of voltages received from the modules to known signatures of different devices in different locations to determine where the device(s) are located. This may be done using machine learning-based algorithms such as Support Vector Machine (SVM) classifier which is trained using test data collected obtained from known configurations and orientations of devices and module networks. In certain embodiments, a multi-layer artificial neural network or other algorithm may be used for the device identification, localization and tracking.

In an exemplary embodiment, an autonomous charging pad for aerial vehicles can include a controller circuit coupled to a plurality of sensing tiles to receive a corresponding plurality of sense voltages, and is configured to determine the location or type of aerial vehicle and each leg of the aerial vehicle based on a pattern of the plurality of sense voltages, the aerial vehicle and the legs of the aerial vehicle being either fixed or movable relative to the charging pad; an array of sensing tiles that includes one or more driven coils to produce magnetic signals in response to drive signals; one or more sense coils disposed to: (a) magnetically couple to the one or more driven coils to receive the magnetic signal produced by the driven coils, and (b) produce a sense voltage as a function of its proximity to the aerial vehicle and/or each legs of an aerial vehicle; and an array of charging coils, the array of charging coils being one or more of inductive or resonance coils configured to deliver power to one or more aerial vehicles or each leg of the aerial vehicle, which are detected and localized by the controller circuit; and a power distribution circuit.

In some embodiments the charging pad can be configured to create a plurality of electromagnetic charging fields based on the number and types of aerial vehicles. One or more radio frequency fingerprinting algorithms can be run thereon for authentication of aerial vehicles and detection of their types using wireless signals from other aerial vehicles. In some embodiments, the charging pad can include (i) one or more arrays of reconfigurable RF transceivers; and (ii) one or more reconfigurable power management circuits.

In an exemplary embodiment, a device for mounting an aerial vehicle includes one or more charging feet adapted to be positioned on one of a plurality of legs of an aerial vehicle; a backpack that is associated with the aerial vehicle, the backpack being configured to run one or more algorithms thereon for authentication of signals. The backpack includes one or more power management circuits, each power management circuit being coupled to at least one coil in the charging feet and each power management circuit being configured to regulate the received energy into a battery-charging voltage level; a power summation circuit that is coupled to all power management circuits to combine the power received from each of the charging feet; a connector circuit that is coupled to power summation circuit and is connected to a battery and adapted to provide the battery-charging voltage level to a battery of the aerial vehicle. The device further includes at least one coil included in the mechanical feet configured to receive energy from one or more external coils; and power management circuitry coupled to the at least one coil to regulate the received energy into a battery-charging voltage level.

The device further includes a configurable RF transceiver that communicates with one or more aerial vehicle charging stations. In some embodiments, the device includes a main microcontroller that coordinates the operation of all components in the backpack and runs a suite of algorithms for authentication of signals transmitted by a wireless radio controller and aerial vehicle charging stations. The algorithms can include deep learning-based models such as radio frequency (RE) fingerprinting algorithms that check signals from a charging pad and/or other aerial vehicles and create real-time inferences for authentication of the charging pad and/or other aerial vehicles. The at least one coil can be contained in appendages extending from a central body of the aerial vehicle.

In some embodiments, the device can include an autonomous landing system that in real-time coordination and communication with an aerial vehicle charging stations enables precise landing onto the charging pad. The autonomous landing system can use a combination of camera, LiDAR, infrared, electromagnetic sensing and RF based localization techniques.

In an exemplary embodiment of a method for charging a group of aerial vehicles, the method can include sensing a location of a second aerial vehicle using a first aerial vehicle; directing power to the second aerial vehicle from the first aerial vehicle based on a relative location of the second aerial vehicle relative to the first aerial vehicle, wherein directing power includes directing electromagnetic energy fields; receiving the power in the second aerial vehicle; and charging a battery of the second aerial vehicle with the power received.

In some embodiments, one or more of the first and second aerial vehicles can each be comprised of a plurality of resonant coils and a controller circuit. The controller circuit can be coupled to each resonant coil of the plurality of coils to receive a corresponding plurality of sense voltages, and is configured to detect the other aerial vehicles based on a pattern of the plurality of sense voltages. Sensing the location of the second aerial vehicle relative to the first aerial vehicle can further include sending or receiving wireless signals from one or more of the first and second aerial vehicles to determine their relative location. The location can be sensed when one or more of the first and second aerial vehicles is in flight.

In some embodiments, directing the power to the second aerial vehicle occurs when one or more of the first and second aerial vehicles is in flight. A flight control of the first and second aerial vehicle can be distributed. Directing the power destined for the second aerial vehicle from the one or more additional aerial vehicles through the first aerial vehicle occurs when the first, second, and additional aerial vehicles are flying.

In some embodiments, the method can further include sensing a location of the second aerial vehicle from one or more additional aerial vehicles and directing the power destined for the second aerial vehicle from the one or more additional aerial vehicles through the first aerial vehicle. The location of the second aerial vehicle from the one or more additional aerial vehicles is sensed via a change of electromagnetic field or sensed voltage of one or more of the resonant coils that are sent or received between the second aerial vehicle and the one or more additional aerial vehicles. In some embodiments, the location of the second aerial vehicle from the one or more additional aerial vehicles is sensed via radio frequency signals that are sent or received between the second aerial vehicle and the one or more additional aerial vehicles. The flight control of two or more of the aerial vehicles during charging is centralized in a processor coupled to a non-transient memory.

In some embodiments, the one or more resonant coils are used for sensing and one or more for charging. The one or more resonant coils in the first aerial vehicle can be magnetically coupled to one or more resonant coils in the second aerial vehicle. In some embodiments, the resonant coils in one or more of the aerial vehicles can be coupled to a power source, and the aerial vehicle calls another aerial vehicle a master aerial vehicle.

In some embodiments, the method can further include a controller circuit in each aerial vehicle has configurable impedance of resonant coils in each aerial vehicle, and a master controller in one or more master aerial vehicles, communicatively coupled to all controller circuits in of the plurality of aerial vehicles, and configured to: select a subset of the plurality of aerial vehicles, excluding some of the plurality of aerial vehicles, to define a electromagnetic power path from the master aerial vehicles to other aerial vehicles in proximity to a cluster of one or aerial vehicles; and control the power source configurations in each mater aerial vehicles and respective impedance of resonant coils of the subset of aerial vehicles to form a chain of wireless magnetic resonance power transmission from the master aerial vehicles to other aerial vehicles.

In some embodiments, each master aerial vehicle has a resonant coil that is coupled with a reconfigurable amplifier circuit. The one or more configurable variables of each reconfigurable amplifier circuit can be coupled, and configured with, a microcontroller. When the control commands are sent to the plurality of aerial vehicles, each aerial vehicle has a radio frequency transceiver to receive and send control messages to make a control wireless mesh network.

BRIEF DESCRIPTION OF THE DRAWINGS

Embodiments of the present disclosure are described by the way of example with references to the accompanying drawings, which are schematic and are not intended to be drawn to scale. The drawings referenced herein form a part of the specification. Features shown in the drawings are meant as illustrative of only some aspects of the presently disclosed embodiments.

FIG. 21 shows a wireless charging pad and UAV according to certain embodiments of the system.

FIG. 26 illustrates exemplary embodiments of ad-hoc UAV charging and peer to peer UAV charging.

DETAILED DESCRIPTION

Figure 1C:
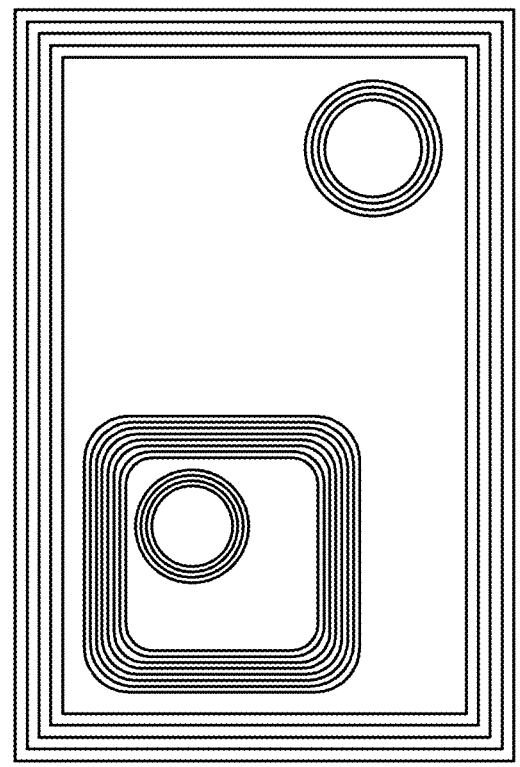
FIG. 1C illustrates yet another exemplary layout of nested sensing coils, where each sensing node includes a combination nested active and passive coils that includes multi-nested coils, two passive and two active coils.
Figure 1B:
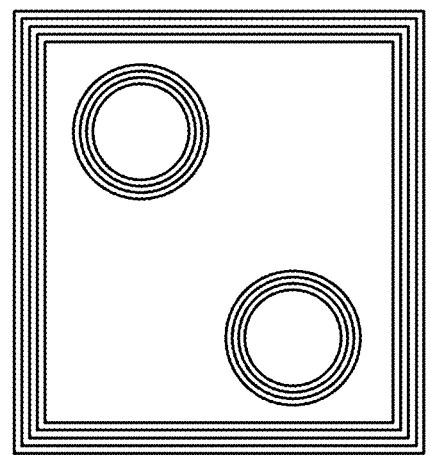
FIG. 1B illustrates another exemplary layout of nested sensing coils, where each sensing node includes a combination nested active and passive coils that includes two inner active coils and one outer passive coil.
Figure 1A:
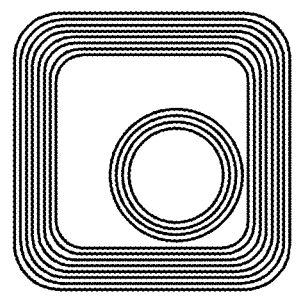
FIG. 1A illustrates an exemplary layout of nested sensing coils, where each sensing node includes a combination nested active and passive coils that includes a dual-coil architecture with one inner-active coil and one-outer passive coil.
Figure 2:
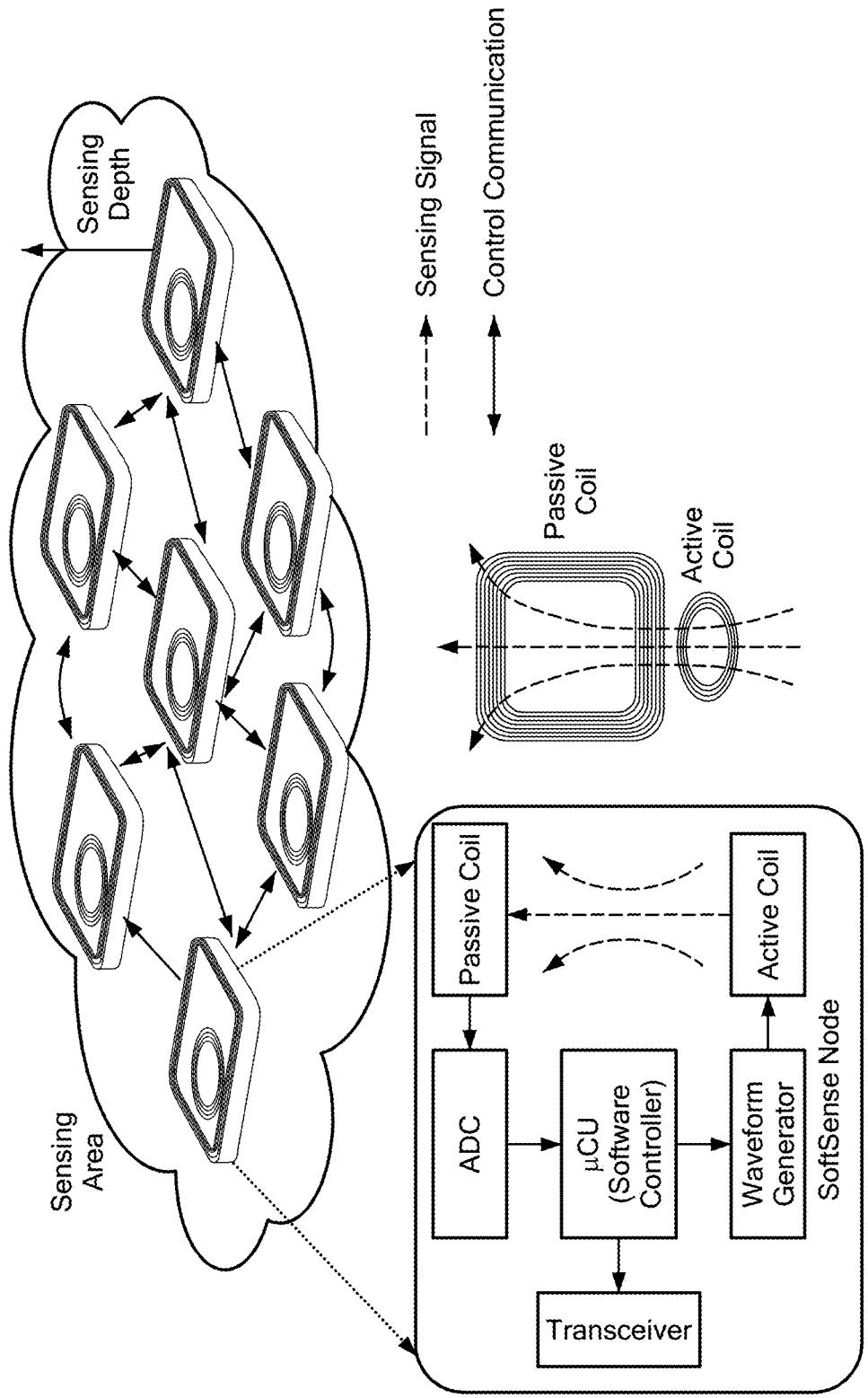
FIG. 2 shows a system overview of collaborative networked coils with individual sensing unit per nested coils.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, compositions, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

The present disclosure generally relates to systems, devices, and methods for sensing and charging of electronic devices using networked coils. In some embodiments, the presently disclosed system can include a pad, a charging foot, and a backpack. The pad having one or more nested coils therein that can sense one or more corresponding receiver coils of an unmanned aerial vehicles (UAV) that landed thereon. The nested coils of the pad can provide charging energy to the UAV independent of the location along the pad in which the UAV landed, and no precise alignment between the receiver coils and the charging coils is required. In some embodiments, the pad can be foldable to provide for easy portability.

Additional accessories can be included to facilitate sensing and charging of the UAV. For example, in some embodiments, the UAV can include a charging foot on one or more legs of the UAV. The charging foot can include a receiver coil and circuitry to regulate energy received by the coil to a charging voltage level that can be provided to the battery of the UAV. Further, a backpack can provide authentication to the UAVs, as discussed in greater detail below.

Sensor Array

FIGS. 1-4 depict an overview of system architecture and components according to certain embodiments. For example, as shown in FIGS. 1A-1C, each sensing node can include a combination of nested active, or driven, and passive coils, with exemplary configurations including: (a) dual-coil architecture 100 with one inner-active coil 102 and one-outer passive coil 104, (b) two inner active coils 102' and one outer passive coil 104' in the sensing node 100', and (c) multi-nested coils in the sensing node 100" having two passive 104" and two active coils 102". The active coils 102, 102', 102" might be connected to a continuous wave generator, and the passive coils 104, 104', 104" might resonate with active coils and extend the sensing area. The nested coils are so designed such that they are in resonance with each other, when there is active current in the active coils 102, 102', 102", the passive coils 104, 104', 104" act a resonator relay that extend the magnetic flux generated by the current with extremely low power consumption. Each such multi-nested coil sensing element 100 (henceforth called as a node) might operate in the kHz or MHz bands and is configured to produce a drive signal.

Figure 3:
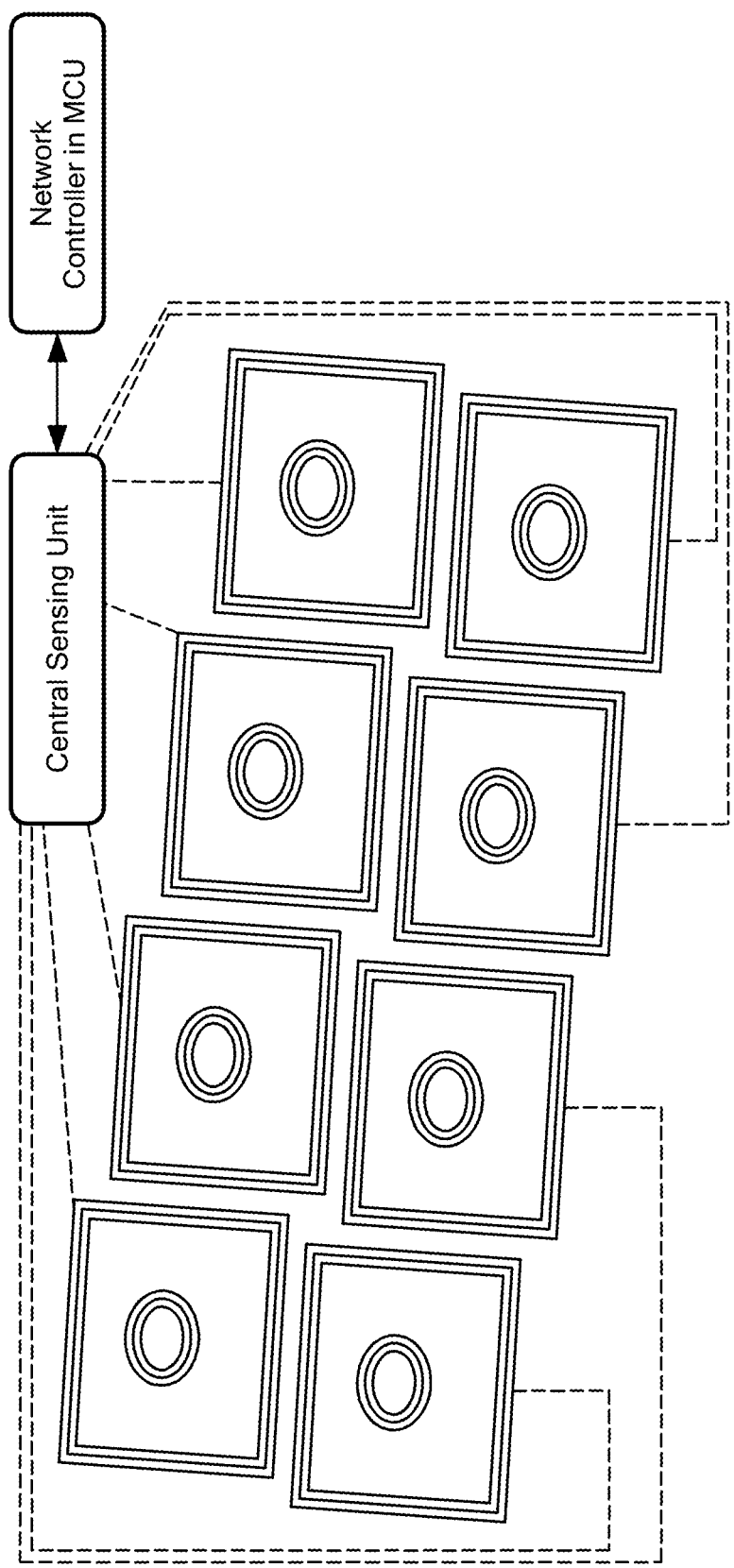
FIG. 3 depicts a system overview of collaborative networked nested coils with one central sensing unit.

In some embodiments, each nested sensing coil 100 might be connected to an individual sensing circuit 106 (FIG. 2) or a group/network of sensing coils 100 might be connected to one or more central sensing circuits 108 (FIG. 3).

In some embodiments, one or more sensing circuits 106 might be connected to a microcontroller that has executable codes in memory.

In some embodiments, a network controller acts as central unit that collects all the sensing readings from multiple sensing coils and run algorithms including classification, identification, and tracking of electronic devices over 2D and 3D areas. The sensing nodes are networked together and might exchange control messages with the network controller.

In some embodiments, multiple sensing nodes 100 might be attached to the underside of a large surface such as a charging pad and desk.

In some embodiments, multiple sensing nodes 100 might be placed in a mixture of vertical and horizontal directions close to each other to create a customized 3D sensing area.

Figure 4:
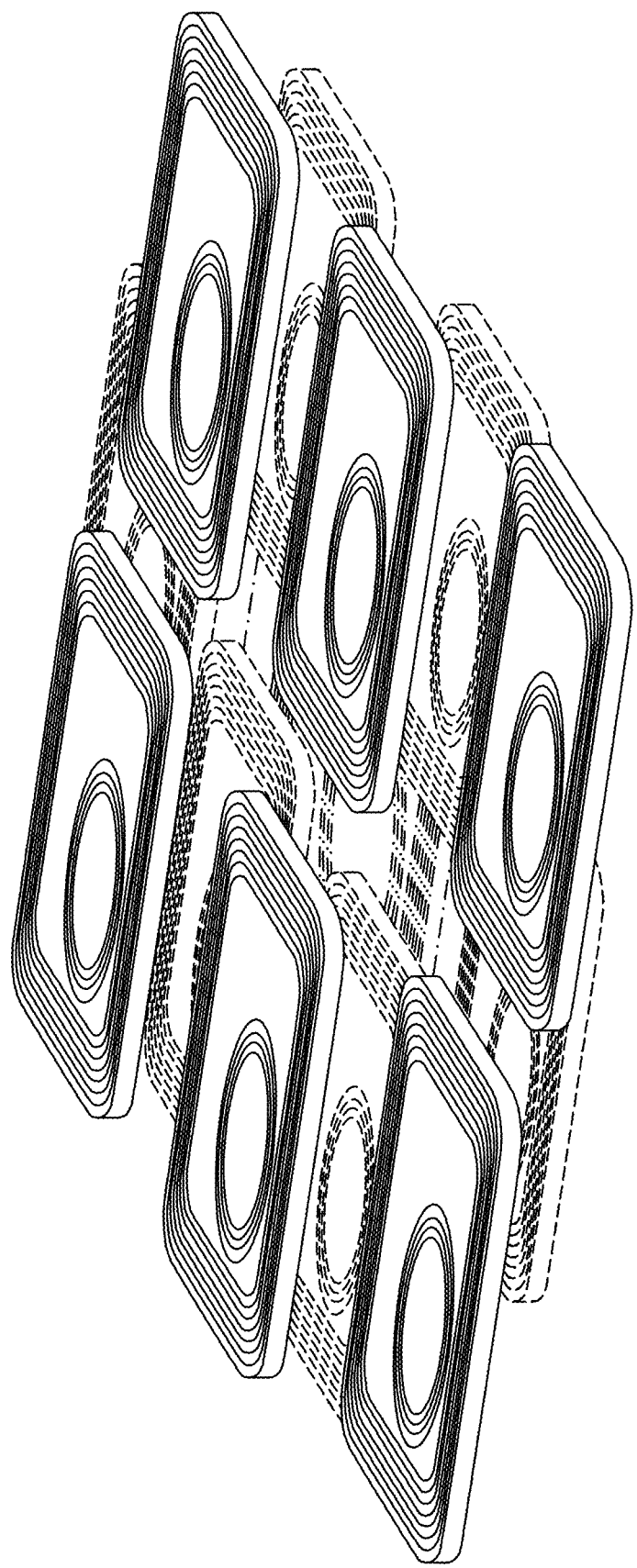
FIG. 4 shows multi-layer nested sensing coils that operate at multiple frequencies.

In some embodiments, as shown in FIG. 4, multiple layers of nested sensing coils 100 might be used to cover an area with high accuracy. Each layer or groups of nested coils might operate at one or more different frequencies.

In some embodiments, when a device is within the networked coils coverage sensing area, each node measures the induced voltage in its outer coils and reports back these measurements, along with its ID, to the central network controller. Similarly, if the device moves, the nodes detect similar changes and transmit update messages to the controller.

The output of each sensing node is measured induced voltages in the outer coils over the time and forms a time-series. The central network controller uses simultaneous time-series from multiple sensing nodes in form of multi-voltage time-series to classify, identity, localize, and track devices over 2D and 3D areas. The controller might run machine learning-based algorithms or fuses all the measurement data reported by the entire node array (networked coils) and matches the voltage patterns with a priori stored signatures.

In some embodiments, the input of each passive coil in a nested sensing node might process in forms of frequency filtering, smoothing, and averaging over customized input windows to eliminate various noises.

The multiple simultaneous streams of voltage time-series from networked coils, might be normalized and feed to a machine learning-based program in microcontroller. The program might use models such as random forest, supper vector machine, and multi-layered neural network for device identification, localization, and tracking.

Figure 5:
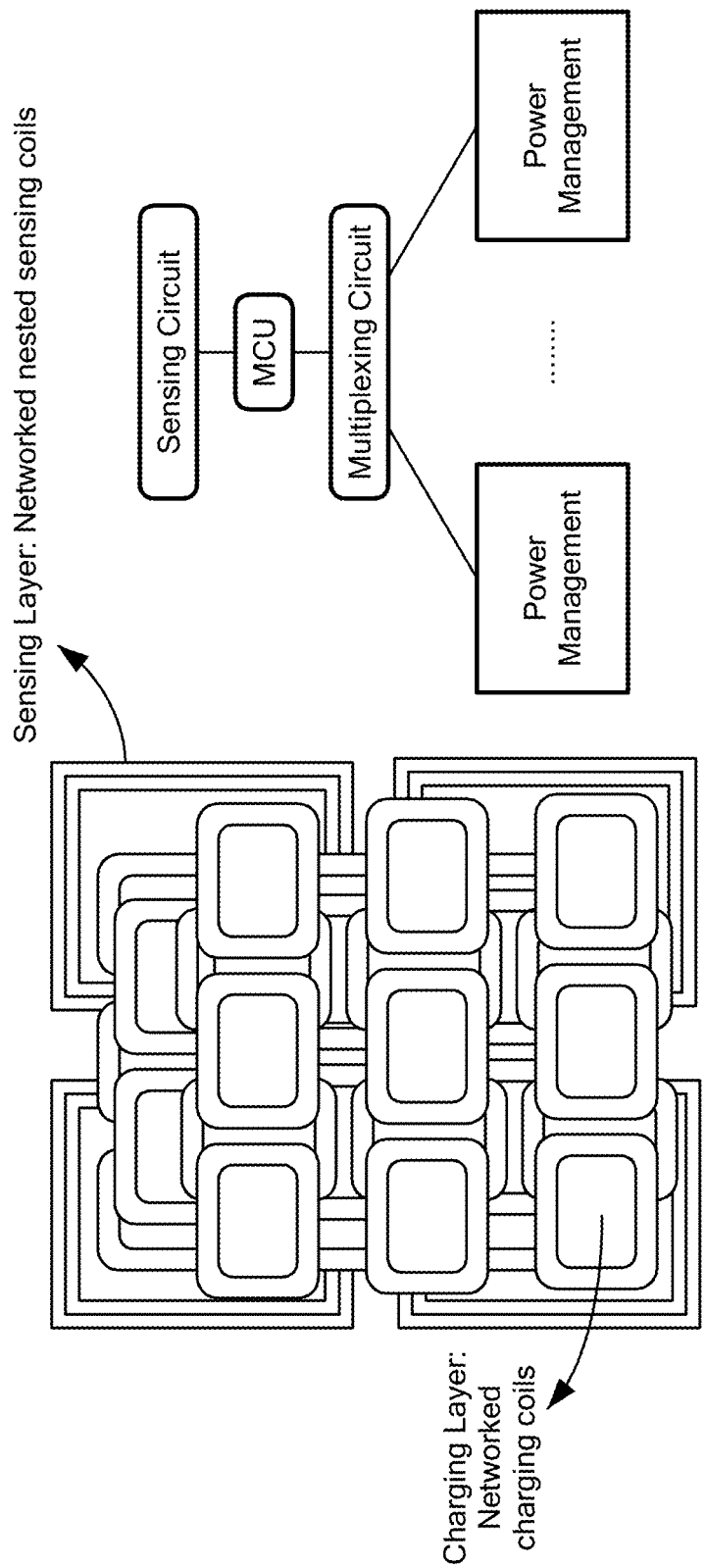
FIG. 5 illustrates a cognitive inductive charging network with layers of nested sensing coils, charging coils, and coils multiplexing.

In some embodiments, as shown in FIG. 5, inductive charging coils can be used. For example, an additional layer of networked charging coils 110 may operate on top of networked nested sensing coils 100 and together create a cognitive inductive charging network 112. This system 112 may multiplex one or more wireless charging power managements to one or more charging coils within the networked charging coils layer, based on the location and type of the detected device/s that would be identified at the network controller (based on collaborative and networked sensing coils measurement). It will be appreciated that, in some embodiments, there is no coupling between networked charging coils 110; for example, the charging coils can just turn on and off.

Figure 6A:
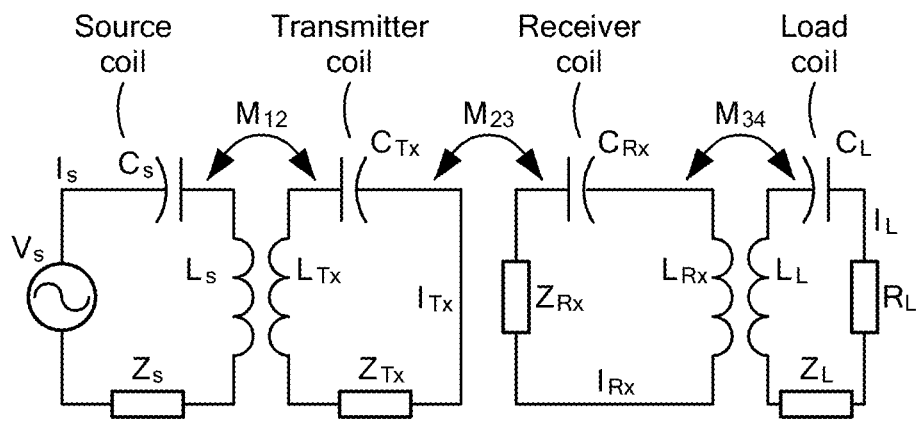
FIG. 6 illustrates circuit schematics of (a) strongly coupled resonant wireless power transfer, (b) dual-coil circuit design, and (c) dual-coil architecture with active inner and passive outer coils.
Figure 6B:
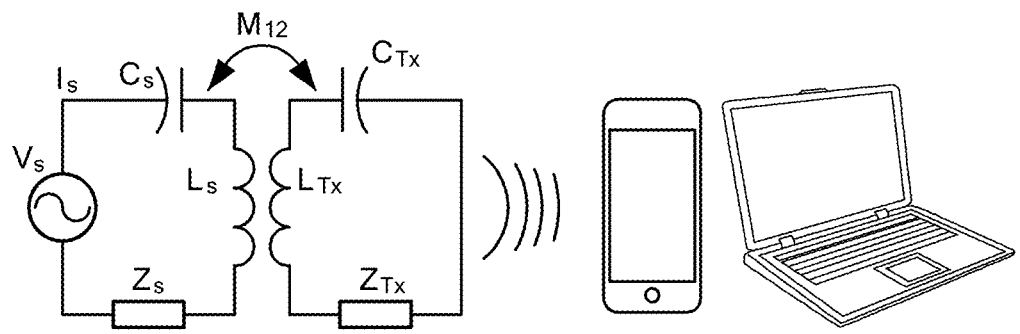
Figure 6C:
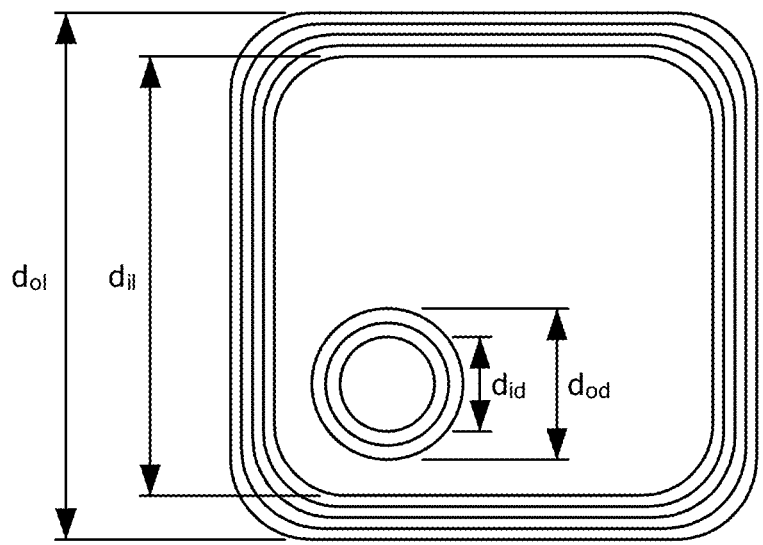

As a background on the theoretical analysis, FIG. 6a shows the circuits 10 for strongly coupled magnetic resonance power transfer, where the source coil connects to the AC power source and generates the magnetic field. The oscillating magnetic flux resonates in the transmitter coil. On the other side, the magnetic flux from the transmitter is converted into the current at the receiver coil. This current creates a secondary magnetic flux within the load coil. This flux is converted into the current as well and consumed by the device represented as R FIG. 6b shows the circuit schematic of for an example of nested sensing with dual-architecture design (dual-coil) and FIG. 6c shows its architecture. Some exemplary values here might be $d_{ol}=12$ cm, $d_{il}=10$ cm, $d_{od}=5$ cm, $d_{id}=3$ cm are outer coil length, inner coil length, outer coil diameter, and inner coil diameter, respectively. Different from wireless power transfer, in the contact-less sensing system, the objects/devices do not need to have a receiver coil inside.

Various devices with relatively high conductive materials such as cell phone, laptop, and mouse change the magnetic field distribution at the transmitter outer coil. This change can be measured in voltage change of the coil and the amount of change depends on multiple variables, such as size, shape, materials, magnetic permeability, electrical conductivity, and the overlapping area between device and transmitter coil. Some additional non-limiting examples of configurable variables can include frequency, peak-to-peak voltage, or output power.

In some embodiments, the software controller can be configured to selectively control transmitters to refrain from transmitting power, the transmitters not being a part of a transmission path from the set of transmission paths.

Table (I) summarizes the circuit parameters that will be used to formulate the voltage gradient in the outer coil theoretically for an example configuration of a dual-coil sensing coil that includes one inner coil and one outer coil.

TABLE I

| Symbol | Description |
|---|---|
| $V_s$ | Input AC signal voltage at source coil |
| $I_s$ | Current amplitude at source coil |
| $C_s$ | Capacitance at source coil |
| $L_s$ | Self inductance at source coil |
| $M_{12}$ | Mutual inductance between source and Tx |
| $Z_s$ | Resistance of input AC signal at source coil circuit |
| $I_{Tx}$ | Current amplitude at Tx coil |
| $L_{Tx}$ | Self inductance at Tx coil |
| $C_{Tx}$ | Capacitance at Tx coil |
| $Z_{Tx}$ | Impedance of Tx circuit |

TABLE I-continued

| Symbol | Description |
| --- | --- |
| $M_{23}$ | Mutual inductance between Tx and Rx |
| $I_{Rx}$ | Current amplitude at Rx coil |
| $L_{Rx}$ | Self inductance at Rx coil |
| $C_{Rx}$ | Capacitance at Rx coil |
| $Z_{Rx}$ | Impedance of Rx circuit |
| $M_{34}$ | Mutual inductance between Rx and load |
| $I_L$ | Current amplitude at load coil |
| $L_L$ | Self inductance at load coil |
| $C_L$ | Capacitance at load coil |
| $R_L$ | Resistance of load coil |
| $Z_{LTx}$ | Impedance of Tx coil |
| $Z_{CTx}$ | Impedance of capacitor at Tx circuit |
| $\omega$ | Angular Frequency of AC source |

The self-inductance, impedance, mutual inductance, resistance, and angular frequency of input AC signal are given, as they depend on characteristics of the hardware and coils. Accordingly, the circuit equations for the dual-coil system can be explained by the following equations:

$$V_s = I_s\left(j\omega L_s + \frac{1}{j\omega C_s} + Z_s\right) - j\omega M_{12} I_{Tx}$$

$$I_{Tx}\left(j\omega L_{Tx} + \frac{1}{j\omega C_{Tx}} + Z_{Tx}\right) + j\omega M_{12} I_s = 0$$

$$Z_{Tx} = Z_{LTx} + Z_{CTx}$$

Here, the change of current amplitude at the transmitter outer coil is negligible because the AC power of inner source coil is very low (mW). At resonant mode, jωLT x and jωCT x cancel each other. VT x is the voltage of outer coil when there is no device and can be calculated as follows:

$$V_{Tx} = j\omega M_{12} I_s$$

$$V_{Tx} = I_{Tx} Z_{Tx} = I_{Tx}(Z_{LTx} + Z_{CTx})$$

Once a device comes within sensing coverage and distance, the impedance of the outer coil Z_LTx changes to Z'_LTx and accordingly the voltage change at the outer coil is calculated as:

$$|\Delta V| = |I_{Tx}(Z'_{LTx} - Z_{LTx})|$$

Collaborative Sensing and Tracking

The presently disclosed embodiments can be configured to determine proximity of the device to the apparatus based on the plurality of sense voltages. While voltage readings in an individual sensing node might detect the presence of a device, they cannot accurately predict the type of devices. Additionally, an individual sensing node is not capable of tracking a device over an area. For example, devices with different sizes and types but the same overlapping coverage with a sensing node can cause the similar intensity of voltage changes. To address these challenges and also enable device tracking, readings from multiple sensing nodes are taken into consideration through collaborative sensing and tracking.

Figure 7B:
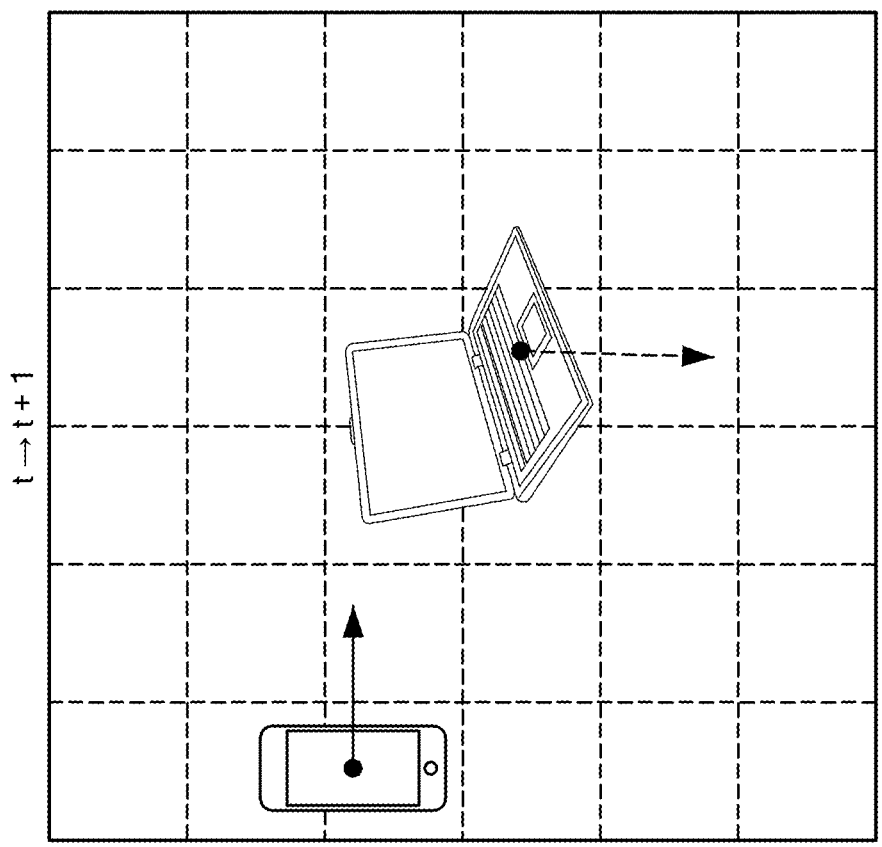
FIG. 7 shows multi-coil network, where each square block denotes a sensing node. Devices transition around the surface (a) from time t−1 to t, and (b) from t to t+1.
Figure 7A:
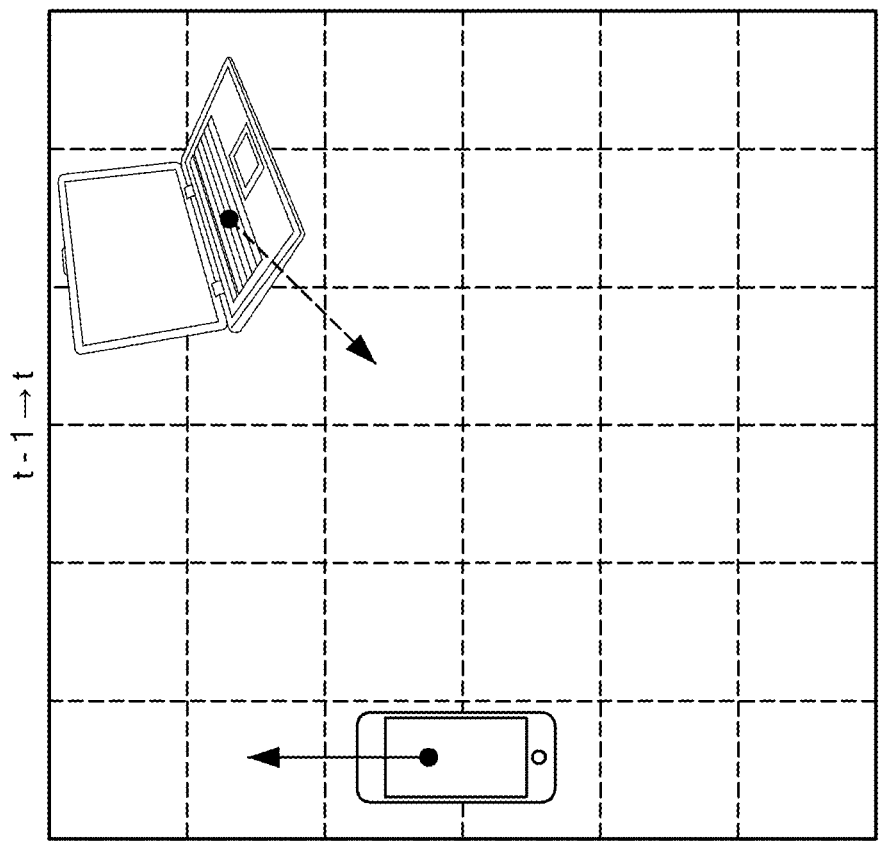

FIGS. 7A-7B show an exemplary multi-coil network 120, where each square block is a sensing node. As shown in FIG. 7A, devices can transition around the surface from time t−1 to time t, or from time t to t+1, as shown in FIG. 7B. This change in location, relative to the sensor array 100, of the can be referred to as (ΔP), which is the change over time between the pattern of the plurality of sense voltages at a sensing time (t) and a corresponding previous pattern of the plurality of sense voltages from an earlier time (t−1). Here, there are m×k nodes that cover a large surface area. To detect the presence of a device, each node senses individually within its sensing coverage and shares voltage with network controller. At time t, m×k voltage time-series and voltage matrix of this network can be computed as follows:

$$V(t) = \begin{bmatrix} V_{11} & V_{12} & \cdots & V_{1k} \\ V_{21} & V_{22} & \cdots & V_{2k} \\ \vdots & \vdots & \ddots & \vdots \\ V_{m1} & V_{m2} & \cdots & V_{mk} \end{bmatrix}$$

where Vij denotes the sensed voltage of the sensing node located at position (i, j). Regardless of the type and size of the device, any sensed voltage higher than a given noise threshold (i.e. empirically determined based on experiments) indicates the presence of a device. Additionally, based on the voltage matrix, the presence of multiple devices over the sensing network and their positions can be detected, when Vij is greater than the noise threshold.

Figure 8B:
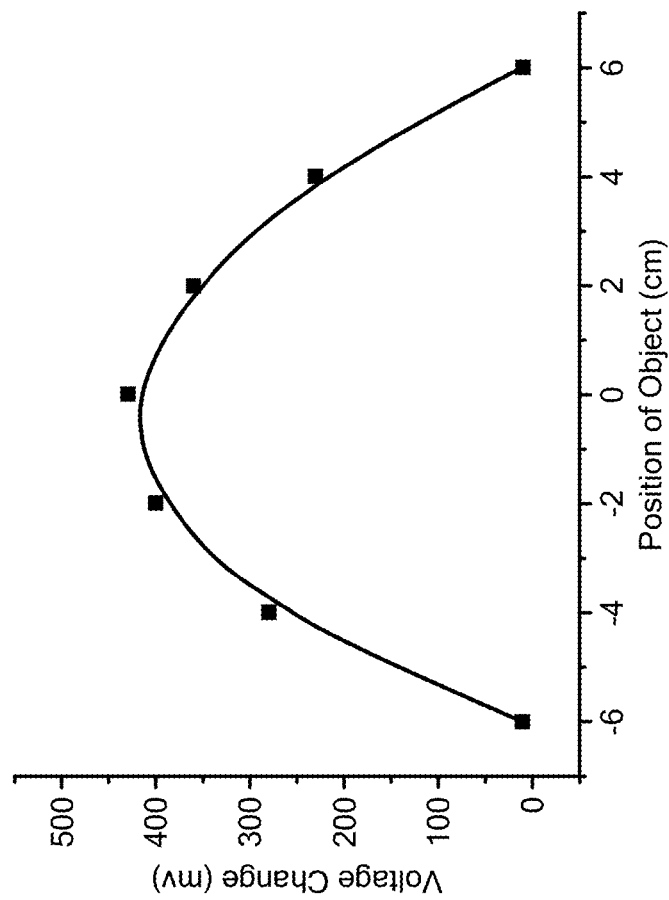
FIG. 8 shows positive and negative voltage changes of a moving device (a) along the x and y axes of sensing coil, and (b) as function of distance from coil center.
Figure 8A:
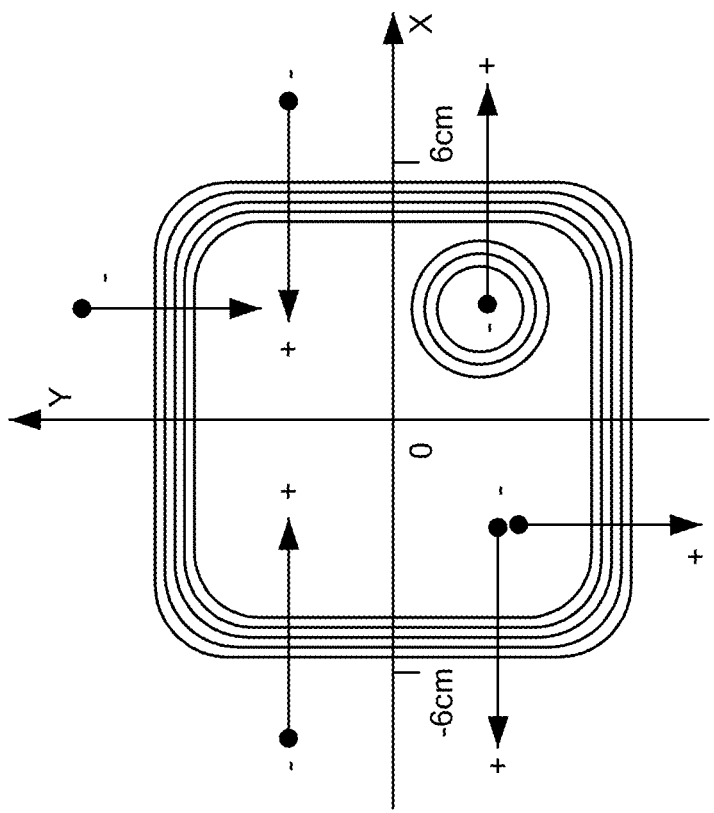

In some embodiments, machine learning based algorithms can be used to detect the type of devices. For example, Support Vector Machine (SVM) classifier can be leveraged, and toward this, the experimental data can be divided into a training and a testing set in a 4:1 ratio, i.e., for each device, out of five experiments, four are used for training and one is used for testing. The feature vector includes (i) range of possible sensed voltages, (ii) number of covered nodes (i.e. connected blocks in FIGS. 7A-7B). First, depending on the overlapping area between a device and sensing coil, the value of voltage change lies within a range as shown in FIGS. 8A-8B, which illustrate positive and negative voltage changes of a moving device along the x and y axes of sensing coil 100, as shown in FIG. 8A, and as a function of a distance from the coil center, as shown in FIG. 8B. Accordingly, sensing data is collected for possible overlapping areas of a device and use the voltage range as SVM feature. Moreover, in some embodiments, a device may cover one or more sensing nodes 100.

In some embodiments, collaborative tracking method can be used first to compute the voltage gradient matrix and then estimate the motion and direction of multiple moving devices through signs of ΔV elements in voltage gradient matrices. This voltage gradient matrix between time t−1 and t is defined as:

$$\Delta V(t-1, t) = \begin{bmatrix} \Delta V_{11}^t & \cdots & \Delta V_{1p}^t & \cdots & \Delta V_{1j}^t & \Delta V_{1j+1}^t & \cdots & \Delta V_{mkt} \\ \vdots & \vdots & \vdots & \vdots & \vdots & \vdots & \vdots & \vdots \\ \Delta V_{i1}^t & \cdots & \Delta V_{ip}^t & \cdots & \Delta V_{ij}^t & \Delta V_{ij+1}^t & \cdots & \Delta V_{ik}^t \\ \Delta V_{i1}^t & \cdots & \Delta V_{i+1p}^t & \cdots & \Delta V_{i+1j}^t & \Delta V_{i+1j+1}^t & \cdots & \Delta V_{i+1k}^t \\ \vdots & \vdots & \vdots & \vdots & \vdots & \vdots & \vdots & \vdots \\ \Delta V_{q1}^t & \cdots & \Delta V_{qp}^t & \cdots & & & \cdots & \Delta V_{qk}^t \\ \vdots & \vdots & \vdots & \vdots & \vdots & \vdots & \vdots & \vdots \\ \Delta V_{m1}^t & \cdots & \Delta V_{mp}^t & \cdots & \Delta V_{mj}^t & \Delta V_{mj+1}^t & \cdots & \Delta V_{mk}^t \end{bmatrix}$$

where ΔV t refers to change in voltage at the sensing coil ij located at position (i, j), between time t−1 and t. Furthermore, the negative and positive signs of ΔVt determine the direction of motion. As shown in FIGS. 8A-8B, if a device is moving toward the center of sensing coil, the voltage changes are positive, and negative if it is moving away. This means the direction of motion is always from negative ΔV to positive. To demonstrate this, FIGS. 7A-7B shows two devices (i.e. phone and laptop) moving from time t−1 to t (FIG. 7A) and then to t+1 (FIG. 7B). The corresponding voltage gradient matrix can be calculated as follows, where motion vectors are determined based on the indicated signs, from negative to positive.

$$\Delta V(t-1, t) = \begin{bmatrix} 0 & 0 & 0 & \Delta V_{14}^t(-) & \Delta V_{15}^t(-) & \Delta V_{16}^t(-) \\ \Delta V_{21}^t(+) & 0 & 0 & \Delta V_{24}^t(-) & \Delta V_{25}^t(-) & \Delta V_{26}^t(-) \\ \Delta V_{31}^t(+) & 0 & \Delta V_{33}^t(+) & \Delta V_{34}^t(+) & \Delta V_{35}^t(+) & 0 \\ \Delta V_{41}^t(-) & 0 & \Delta V_{43}^t(+) & \Delta V_{44}^t(+) & \Delta V_{45}^t(+) & 0 \\ 0 & 0 & 0 & 0 & 0 & 0 \\ 0 & 0 & 0 & 0 & 0 & 0 \end{bmatrix}$$

$$\Delta V(t, t+1) = \begin{bmatrix} 0 & 0 & 0 & 0 & 0 & 0 \\ \Delta V_{21}^{t+1}(-) & \Delta V_{22}^{t+1}(+) & 0 & 0 & 0 & 0 \\ \Delta V_{31}^{t+1}(-) & \Delta V_{32}^{t+1}(+) & \Delta V_{33}^{t+1}(-) & \Delta V_{34}^{t+1}(-) & \Delta V_{35}^{t+1}(-) & 0 \\ 0 & 0 & \Delta V_{43}^{t+1}(-) & \Delta V_{44}^{t+1}(-) & \Delta V_{45}^{t+1}(-) & 0 \\ 0 & 0 & \Delta V_{53}^{t+1}(+) & \Delta V_{54}^{t+1}(+) & \Delta V_{55}^{t+1}(+) & 0 \\ 0 & 0 & \Delta V_{63}^{t+1}(+) & \Delta V_{64}^{t+1}(+) & \Delta V_{65}^{t+1}(+) & 0 \end{bmatrix}$$

A Node

Figure 9B:
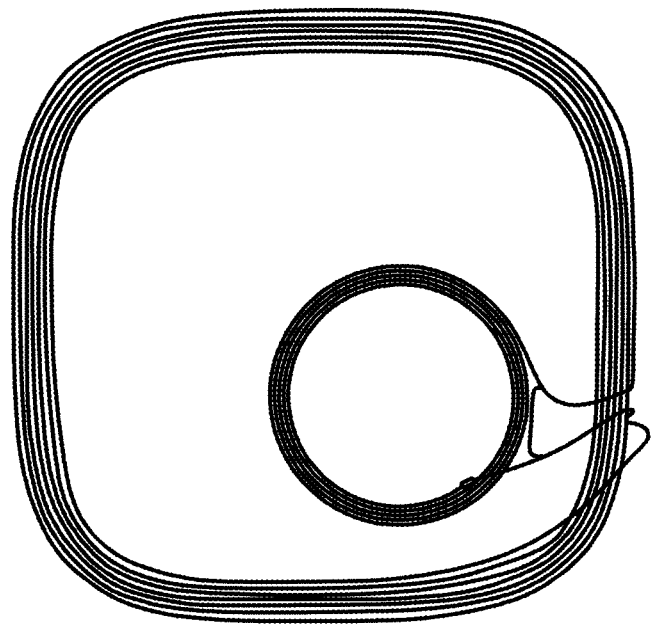
FIG. 9 shows a node having (a) fabricated PCB board, and (b) fabricated dual coil.
Figure 9A:
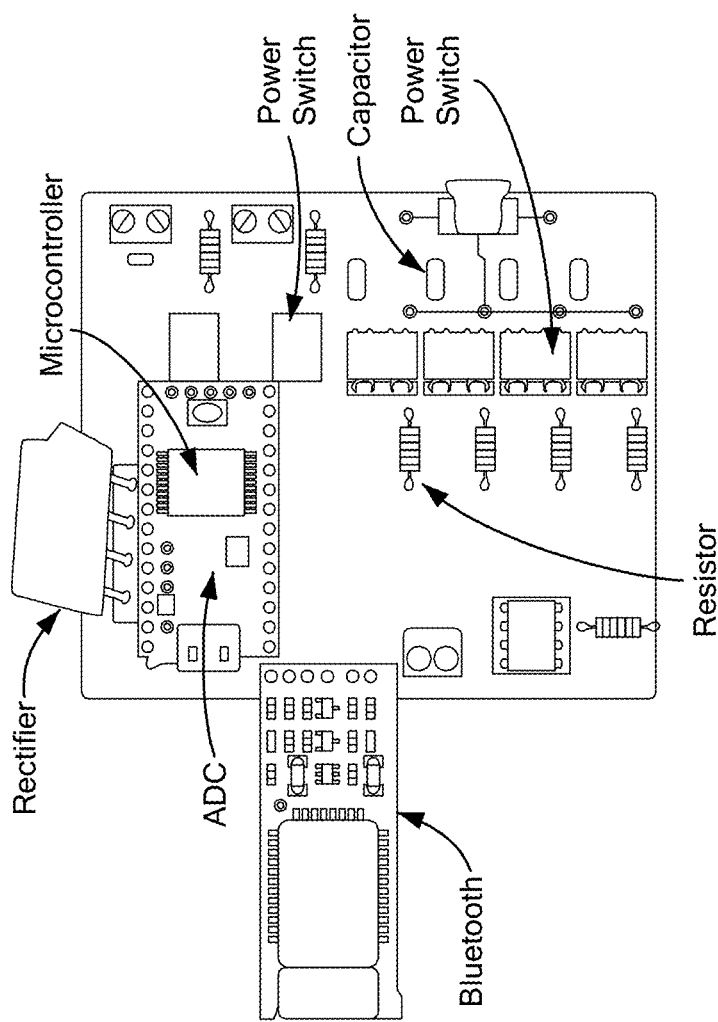

FIGS. 9a-9b show components of an exemplary low-power sensing node with nested sensing coils, referred to as a SoftSense node. Here, the microcontroller unit includes 3 sub-units: a waveform generator, an analog-digital converter (ADC), and a BLE communication module (RN-42 BLE Chip). The waveform generator generates low-power square-wave signal at 200 kHz and applies it to sensing coil. The dual-coil sensing configuration has sub-coils of two different sizes and shapes. The inner coil is connected in serial with a capacitor and then linked to a waveform generator to generate a magnetic field by resonating at 200 kHz. The voltage rectifier converts the AC voltage at the outer coil into functional DC voltage. The presence of a device within the sensing coil coverage causes the voltage drop at the output of voltage rectifier. The analog digital converter in the microcontroller unit converts this voltage drop at the output of voltage rectifier into digital format. FIG. 9a shows the fabricated printed circuit board (PCB) 128 of one exemplary prototype. The PCB board 128 is designed as two layers, one of which serves as a ground plane and fabricate it with FR-4 epoxy glass substrate. A Teensy 3.2 can be used as microcontroller unit. It contains a 32 bit ARM Cortex-M4 72 MHz CPU and 12-bit analog digital converter. This unit performs functions of the waveform generator and analog digital converter. ON Semiconductor GBU8JFS-ND full-bridge rectifier chip is used as the voltage rectifier. Additionally, FIG. 9b shows the fabricated dual-coil 130 made of litz wire with 1.15 mm diameter. This is same as the wire used in state-of-the-art standards such as Qi, and the self-inductance of outer 134 and inner coils 132 are 20 uH and 5 uH, respectively.

Figure 10A:
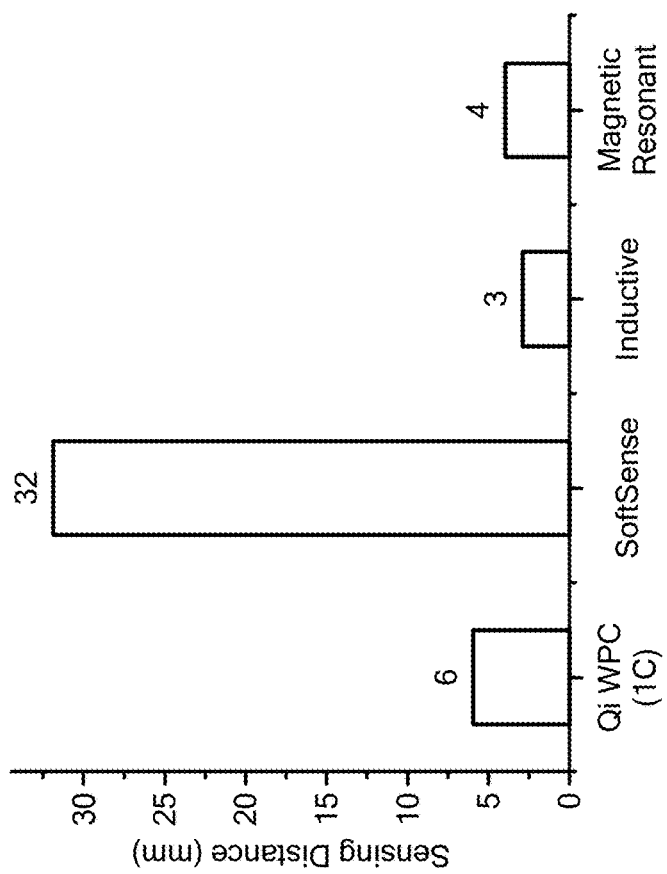
FIG. 10 depicts a sensing performance comparison in terms of (a) power consumption, (b) sensing distance, and (c) sensing coverage.
Figure 10B:
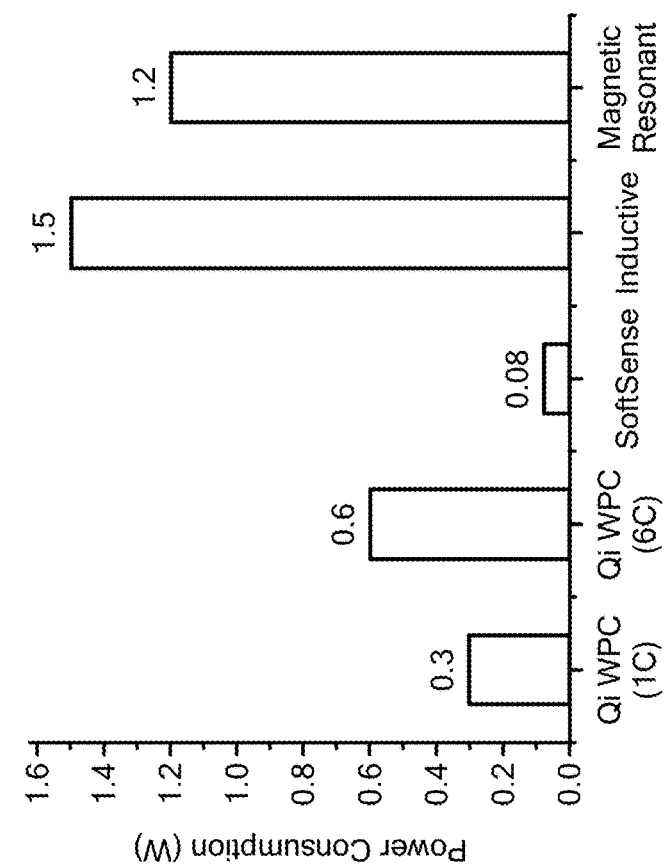
Figure 10C:
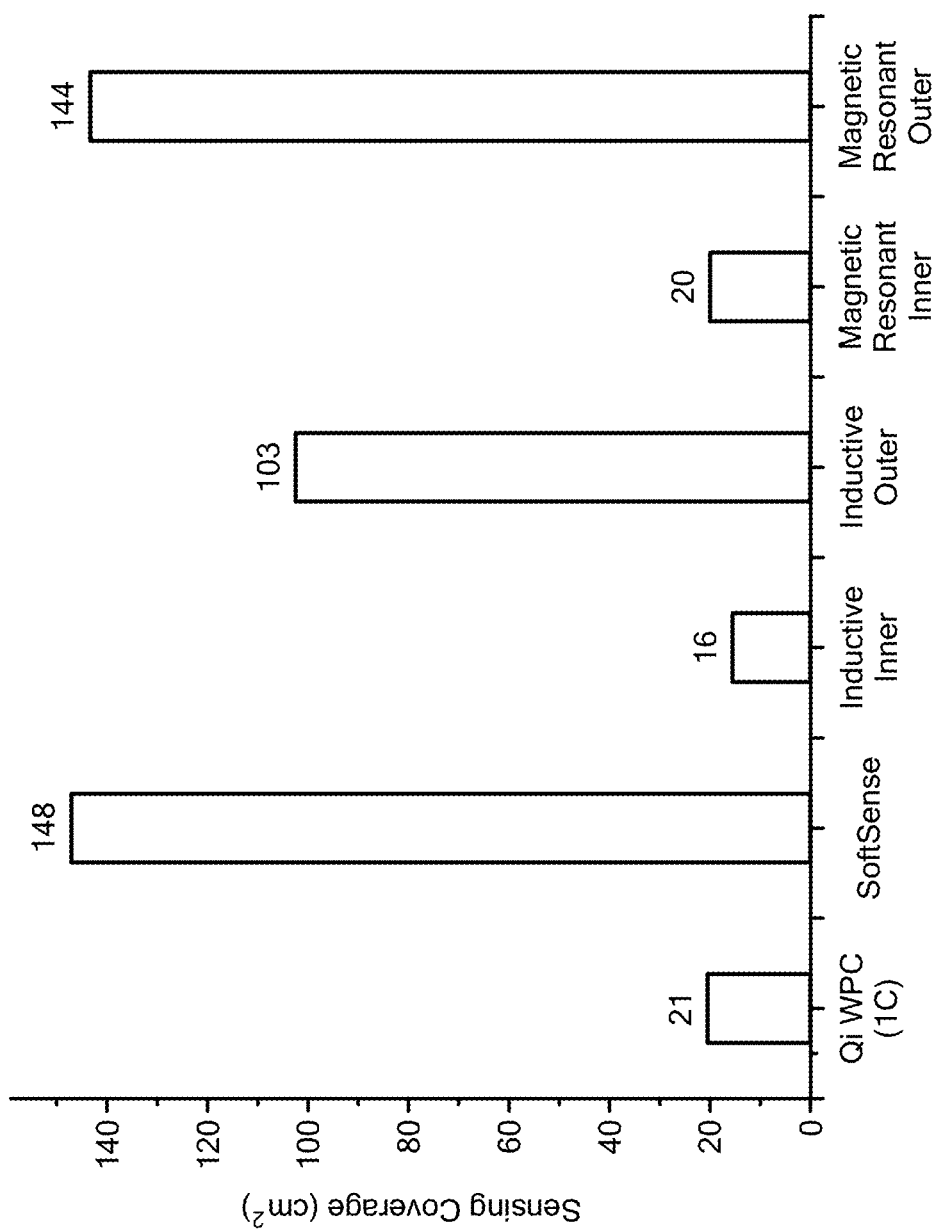

In some embodiments, the can include a multi-layer printed circuit board, in which the driven coil is disposed on a first set of layers of the multi-layer printed circuit board; and the sense coil is disposed on a second set of layers of the multi-layer printed circuit board. The second set can be selected from one of: (a) a first subset of layers of the multi-layer printed circuit board, which is not co-extensive with the first set of layers; and (b) a second subset of layers of the multi-layer printed circuit board, which does not share any layer with the first set of layers. In alternate embodiments, the node 100 can be devoid of a customized circuit or additional coil for sensing or detection FIG. 10a compares power consumption between "inductive sensing" that includes a coil with the same size of the outer coil as the coil fabricated in FIG. 9 (SoftSense). The coil is connected to the wave generator, and "magnetic resonance sensing" includes one coil with the same coil size and a resonant capacitor connected to wave generator, which is set to sense up to 3 cm. Additionally, the coils are compared with Qi (i.e. WPC standard version 1.2) that uses a combination of digital and analog pings for device sensing. Here, consider two Qi configurations with (1) one sensing coil that results in 12% sensing area of SoftSense, and (ii) six overlapping coils that provide same sensing area as the SoftSense node. It can be observed that SoftSense consumes 18.5× less than the inductive sensing, 15× less than magnetic resonance sensing, 7.5× less than Qi with six coils, and 3.75× less than Qi with one coil. FIG. 10b compares sensing distance between Qi, inductive sensing, magnetic sensing, and SoftSense. Here, sensing distance is set as the maximum distance that a phone can be detected with 95% accuracy. It has been shown that SoftSense significantly outperforms other techniques more than 5×. FIG. 10c depicts the sensing coverage and considers two sensing configurations for each of inductive and magnetic resonance sensing, one with a small as inner SoftSense active coil, and second with the same size as the outer coil. As shown, SoftSense provides the highest sensing coverage compare to other methods.

FIG. 11 evaluates the performance of SoftSense to identify the type of devices based on the measured voltage change. An SVM-based classifier for seven devices with different sizes and shapes, such as phone (iPhone X), laptop (Acer TravelMate X3), mouse (Logitech wireless mouse m275), metal (size 7 cm×7 cm and thickness of 1 mm), game controller (Xbox wireless controller), and power adapter (Belker 70w laptop charger), were trained and tested. One hundred and fifty experiments were conducted for each type of device, and for each experiment, data was collected with a sampling rate 20 ms for the duration of 5 s. The nodes are placed on three over-surface materials: a large conference table with wood, a coffee shop table with hybrid wood, and a library table with hard plastic. The sensing nodes are placed at distance 3 cm from each other, ensuring the full sensing coverage of the surface.

Figure 11A:
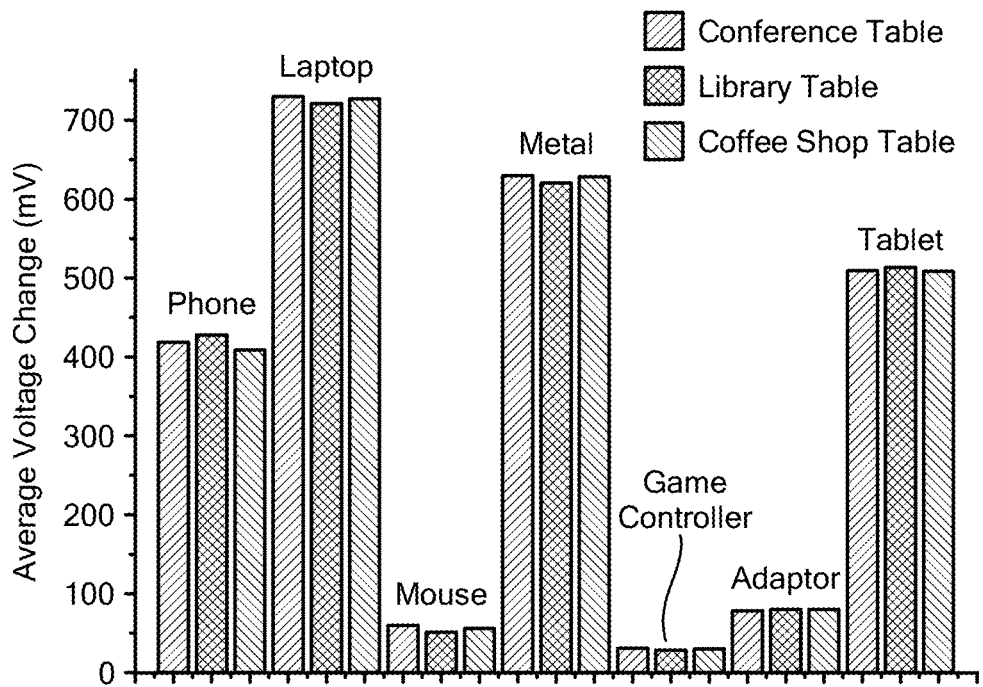
FIG. 11 illustrates (a) average voltage change for different devices and three over-surface materials. Device detection accuracy for (b) different types of devices, and (c) different sensing distances.
Figure 11B:
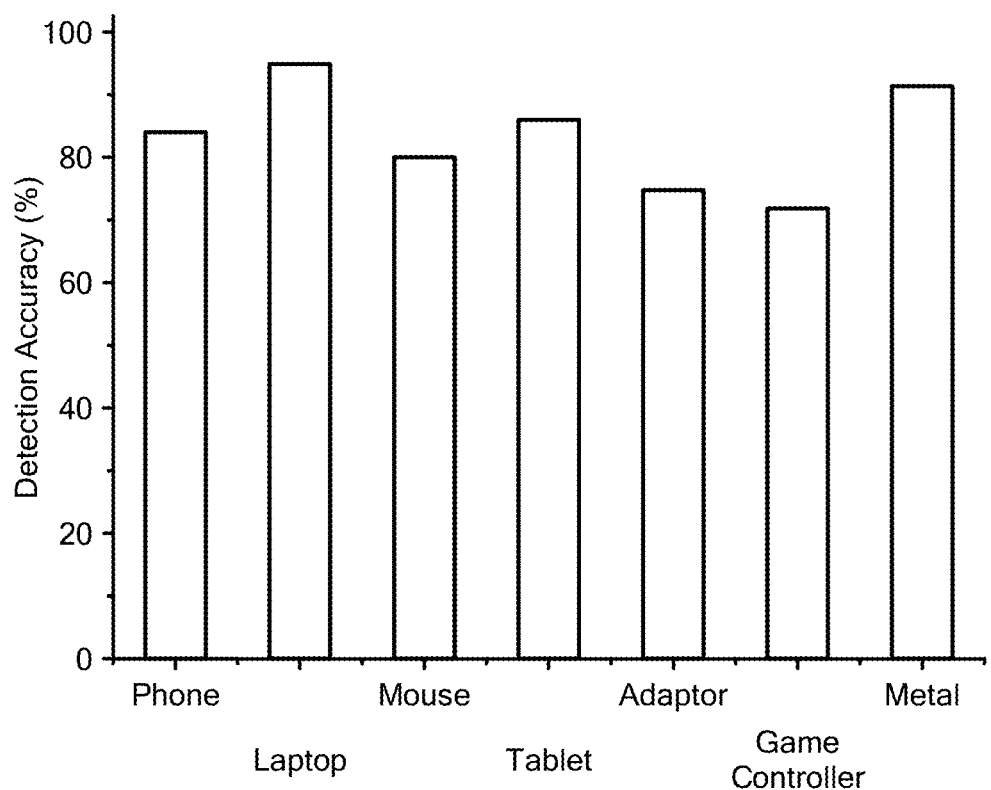
Figure 11C:
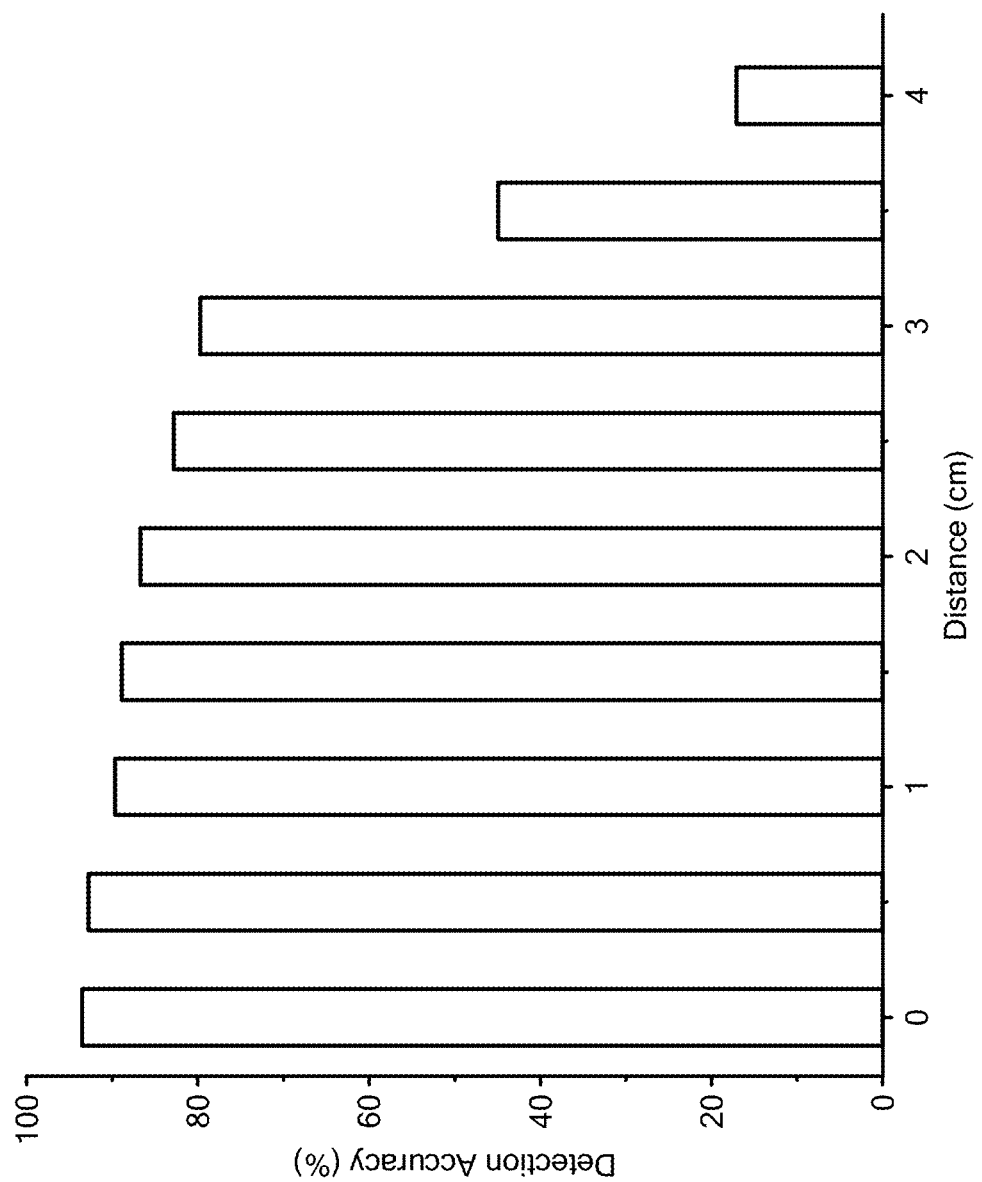

FIG. 11a shows the average measured voltage changes for different device types when it is placed in the center of the coil. It can be observed that regardless of surface materials different devices cause distinguishable levels of the voltage change. On the other hand, FIG. 11b depicts the device detection accuracy of different types at the fixed sensing distance 3 cm. In classification evaluations, experiments were conducted for different overlapping areas between sensing coil and device, as one of the SVM input features along with the number of nodes that the device has covered. One of the main reasons of misdetection error here is the hardware impairments due to ADC errors such as analog-signal source resistance, analog-input signal noise, and ADC dynamic range change, on the sensing signal. FIG. 11c shows the results for detection accuracy at different sensing distances for the device "phone". It indicates that 3 cm as the effective sensing distance that is similar for other device types.

Figure 12:
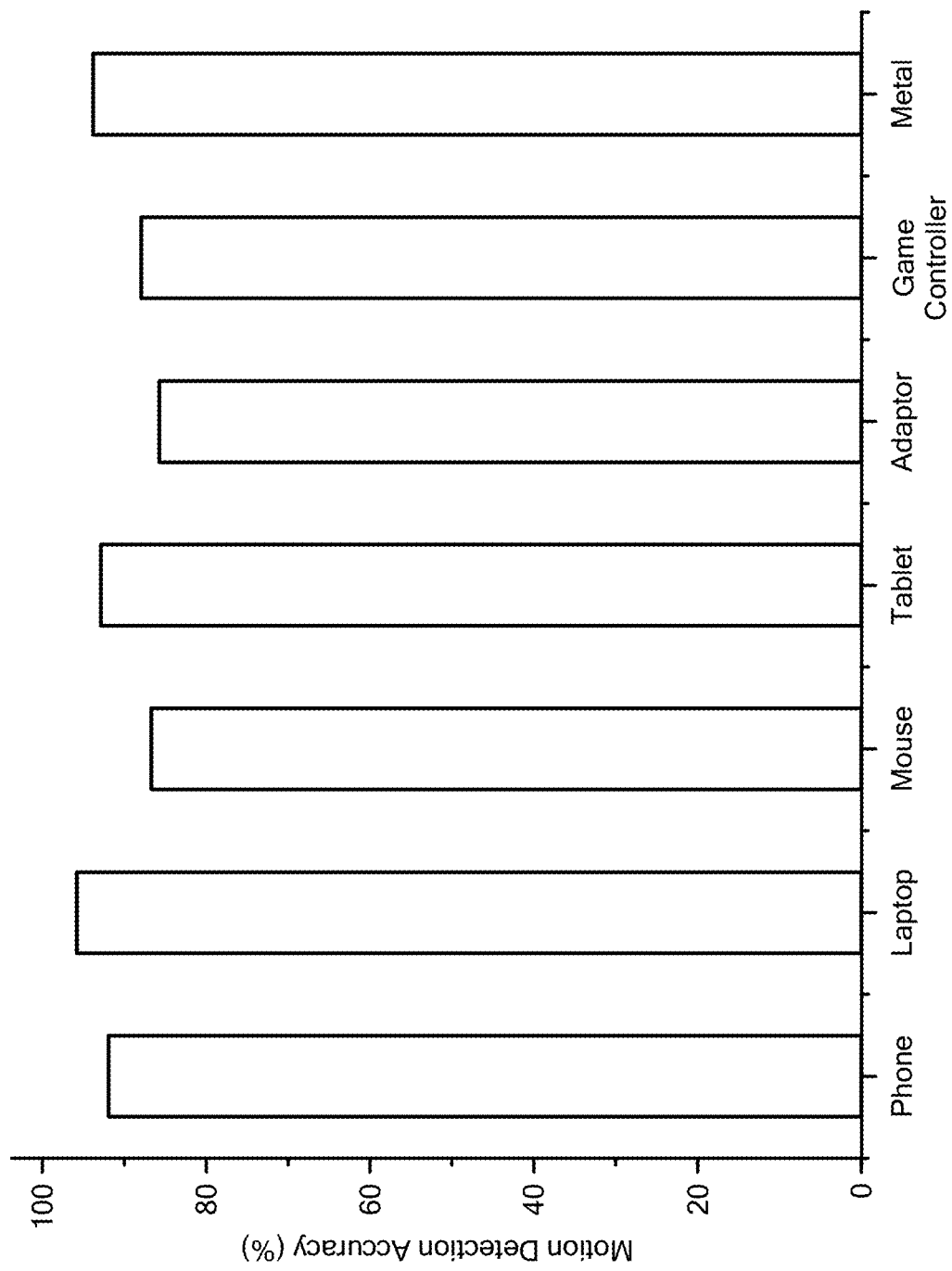
FIG. 12 illustrates results for tracking accuracy for different types of objects.

FIG. 12 presents the results for motion detection accuracy of different types. ADC errors that result in more than 100 mV voltage change could be enough to swap the signs of estimations in the voltage gradient from positive to negative or negative to positive and lead to motion misdetections. Despite such errors, FIG. 10 indicates the high accuracy of SoftSense device tracking.

Software-Defined Wireless Charging Network

Figure 13:
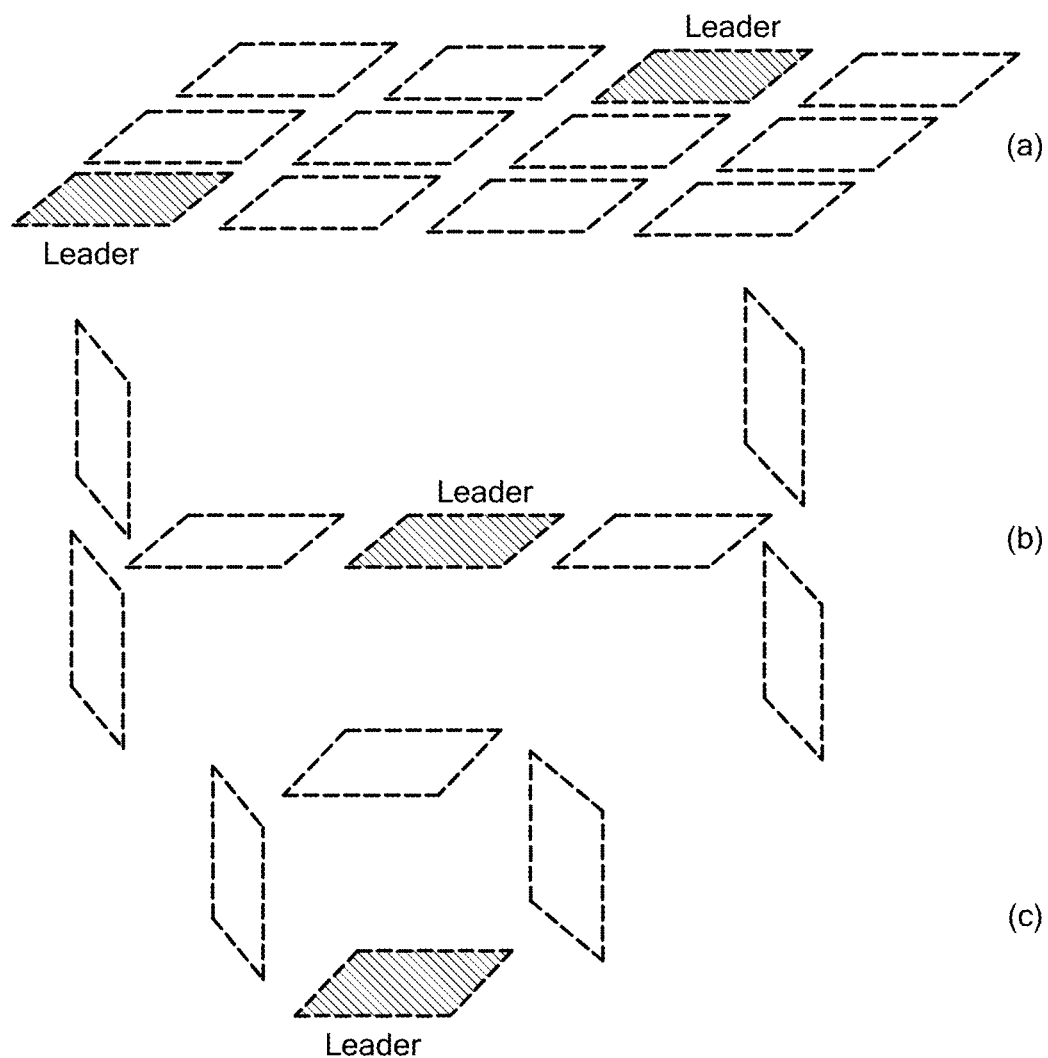
FIG. 13 illustrates arbitrary and customizable 2D and 3D wireless charging areas can be created through cognitive energy tiles and a software-defined wireless charging network.
Figure 14:
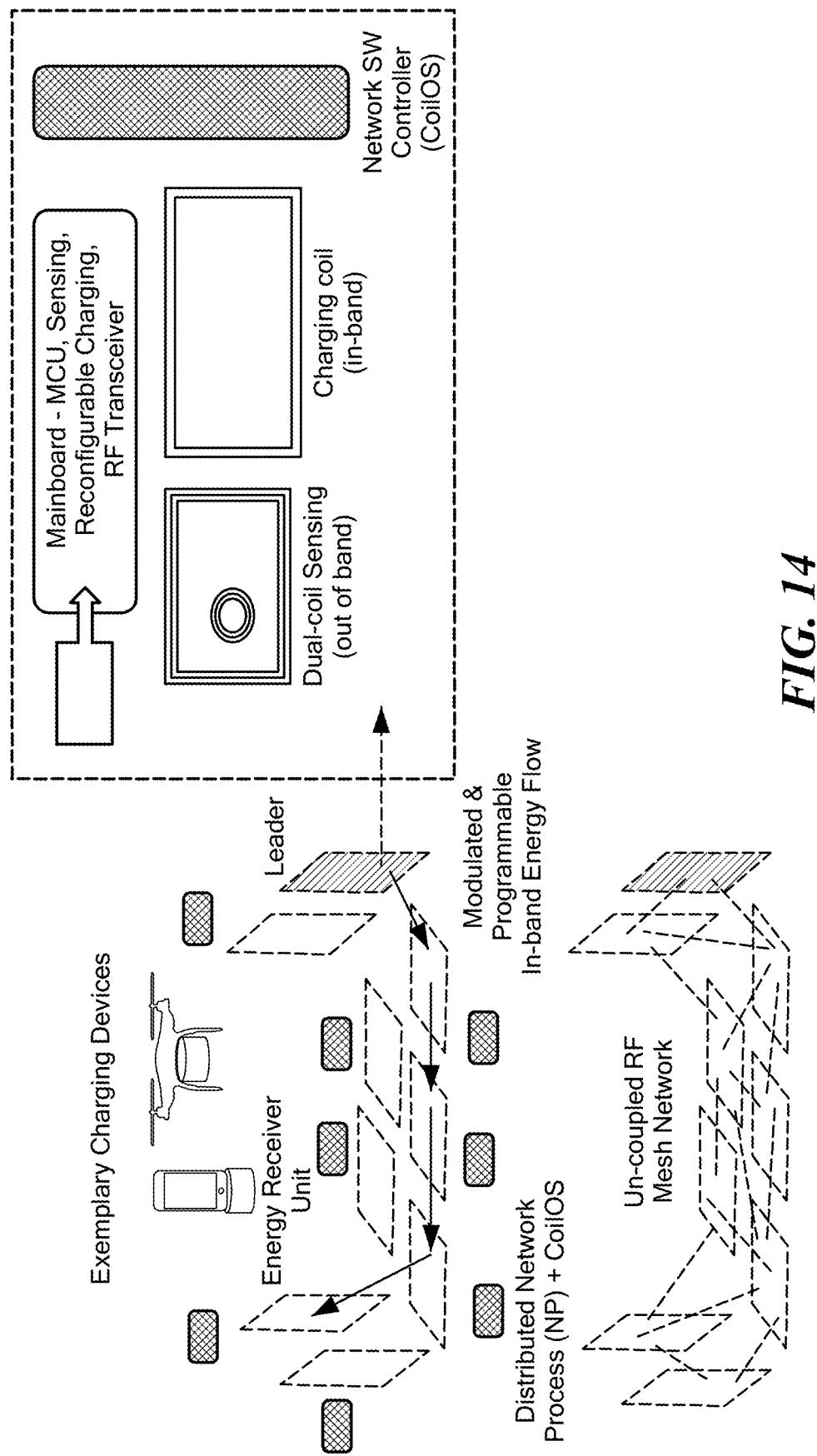
FIG. 14 shows an overview of software-defined wireless charging network and cognitive energy tile nodes.

In some embodiments, a "software-defined wireless charging network," is provided as a network of inter-connected and multi-hop cognitive charging transmitters (call cognitive energy tiles), that creates arbitrary and customizable 2D and 3D over-distance wireless charging areas, and capable of charging multiple heterogenous types of devices. As shown in FIGS. 13 and 14, aspects of the illustrative embodiments of this magnetic resonance charging may include:

I. A distributed network process running within a microcontroller of each energy tile 138 (at least one memory component encoded with computer executable modules) operable to run various operations such as distributed resonance sensing, reconfigurable energy hopping, and data/control communication, and switch between different operational states;

II. A plurality of hardware components within each energy tile 138 for out-of-band KHz resonance sensing, coupled to the at least one dual-coil sensing architecture coil;

III. At least one cognitive energy tile master or leader 138 that includes:
  a. A reconfigurable amplifier module 140 that can create frequency, phase, and amplitude modulated energy signals,
  b. At least one charging coil 142,
  c. At least one microcontroller and memory component encoded with computer executable modules including one or more modules of the software controller, and
  d. A plurality of hardware components for reconfiguring the impedance and resonance of the charging coil;

IV. Programmable in-band and modulated energy flows via multi-hop network of cognitive energy tiles through strongly coupled MHz magnetic resonance energy hopping. Modulated energy flows may carry overlaid data or control information through their modulations between two or more energy tiles as well as energy tiles and the energy receiver unit/s 146.

V. Out-of-band un-coupled radio frequency modules 147 within each energy tile that create a mesh network for data and control message exchanges between energy tiles as well as between energy tiles and the energy receiver unit/s.

VI. Network software controller 148 that based on the various sensing inputs from energy tiles 138 and energy receivers, manages and adjusts at least one of (not limited): software-defined charging network, energy tiles, energy flows, charging capacity and load of the system, charging QoS, charging policy, device localization, authentication, profiling, and tracking, as well as mobile device charging management, safety analysis, and hardware diagnosis analysis.

VII. At least one energy receiver unit 146, comprising:
  a. At least one charging coil 142,
  b. A plurality of hardware components to harvest resonance energy at MHz and enable/disable coil in energy reception chain,
  c. May have a microcontroller and a memory component encoded with computer executable modules to enable a set of active coils as well as measure and monitor the connected receiver device load, and harvested power voltages. The controller can use the array of sensing tiles to detect the presence of at least one device adjacent to the transmitter array, each such device being a detected device. Execution of the instructions by the controller can determine, for each device of a set of devices proximate to the transmitter array, a device location relative to the transmitter array; and selectively cause a subset of transmitters to transmit power, the subset comprising fewer than all of the plurality of transmitters of the transmitter array, the subset including, for each detected device, transmitters at the device location.

Programmable and Modulated Coupled Power Routing

In some embodiments, the present embodiments include a software-defined and networked wireless charging architecture based on "programmable and modulated coupled power routing (PMCPR)" concept and magnetic-resonance energy transfer for charging electronic devices over area and distance. This enables shaping the energy fields in a multi-hop inter-connected network of coils by collaboratively and in real-time reconfiguring the resonance coupling between distributed coils through a software controller and create optimal energy flows from one or more energy sources toward multiple destinations.

In some embodiments, the present embodiments combine magnetic resonance-based energy transfer with "modulated power routing and coupling" across energy tiles, where the magnetic fields are carefully shaped on the fly.

In some embodiments, the system and method include multiple cognitive and software-defined energy tiles with two roles leader and energy relay, a distributed operating system 150 acts as software controller for managing the energy tiles resources, sensing and localizing the devices, enabling communications, message exchange, and shaping the power, one or more user-supplied or commercially obtained devices, reconfigurable multi-layer energy receivers that are interfaced with the devices to convert magnetic energy into electrical, and one or more remote energy edge node that may monitor, and manage energy tiles as remote part of software controller.

In some embodiments, the energy tile leader may modulate the generated energy signals in terms of frequency, amplitude, and phase. This enables overlaid data or control information over the energy flows, and may be used for implementation of integrated data communication and energy transfer between energy tiles and between tiles and the energy receivers.

In some embodiments, the programmable power coupling feature of illustrative embodiments makes the charging architecture highly flexible over any customizable area as all energy tiles can be reconfigured quickly and adaptively. It decouples the power routing (power coupling) function of each energy tile from the wireless charger hardware, and manages the networked cognitive energy tiles in the software controller 150.

Some embodiments create customizable energy shapes in 2D/surface and 3D through collaborative operation of cognitive energy tiles that charge at the same time one or multiple numbers and types of electronic devices equipped with energy receivers and within system charging and sensing ranges without need to change of wireless charging hardware.

In some embodiments, the software controller 150 configures the drive signals of each tile of the plurality of tiles, the drive signals being configured with respect to one or more of shape, duty-cycle, or power. configures the drive signals of each tile of the plurality of tiles, the drive signals being configured with respect to one or more of shape, duty-cycle, or power.

In some embodiments, modularity of cognitive energy tiles enables charging coverage extension vertically and horizontally to power devices located over large surface and space simply by adding more energy relays, and plug and play system upgrade.

In some embodiments, each energy tile may include cubic shape architecture with re-configurable multi-layer vertical and horizontal coils at each tile's edge. Such design enables the software controller to select, for each edge of an energy tile, the active coil layers, which in turns determines the distance, coverage, and amount of power coupling between two or more tiles.

In some embodiments, the cognitive energy tiles can be placed in different vertical and horizontal arrangement such as horizontally under an existing surface (large or small), vertical and horizontally inside a box, desk drawer, shelfs, cabinet, etc.

Software Controller (Operating System)

Figure 15:
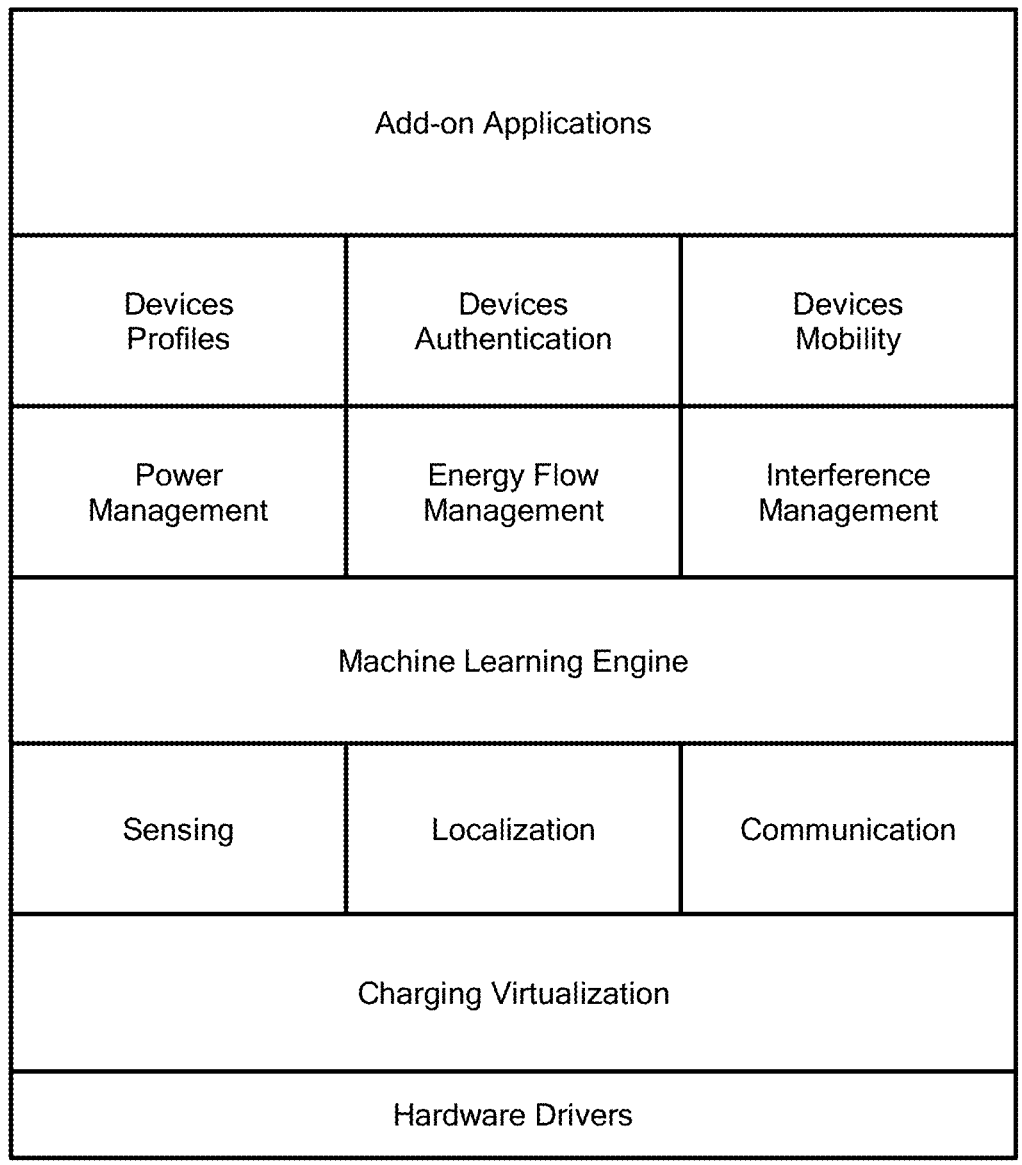
FIG. 15 depicts an overview of main modules of the proposed software-defined and networked wireless charging architecture.

FIG. 15 depicts the modules of the software controller 150, or operating system, which are from bottom to top as: hardware drives 152, charging virtualization 154, sensing 156, localization 158, communication 160, machine learning engine 162, power management 164, interference management 166, energy flow management 168, devices profiles 170, devices authentication 172, devices mobility 174, and applications 176 such as diagnosis analysis, real-time safety check, dashboard and notifications, usages profiling, etc.

Figure 16:
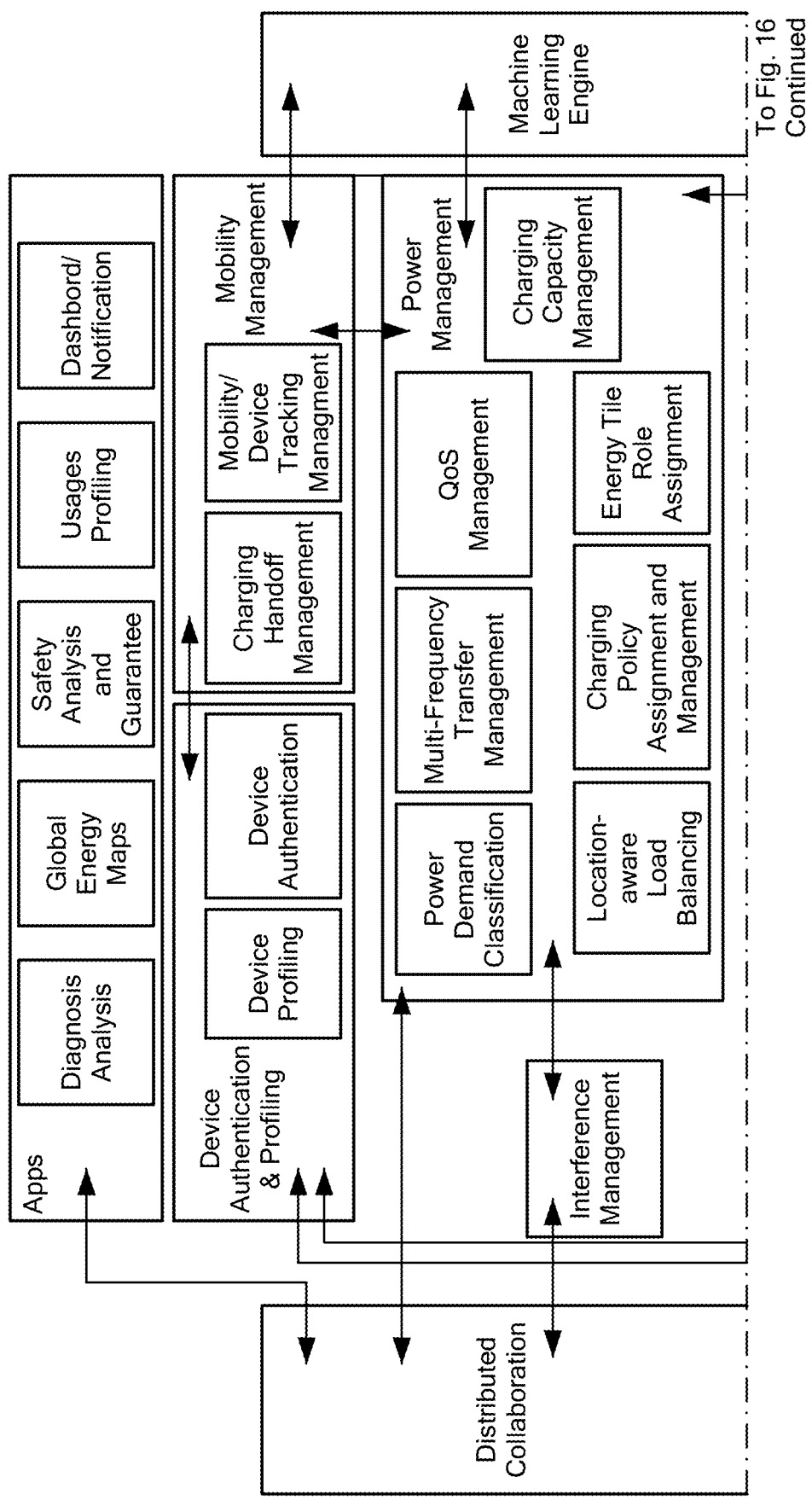
FIG. 16 shows an overview of the functional and architectural blocks for software-defined wireless charging and their interconnectedness.
Figure 16:
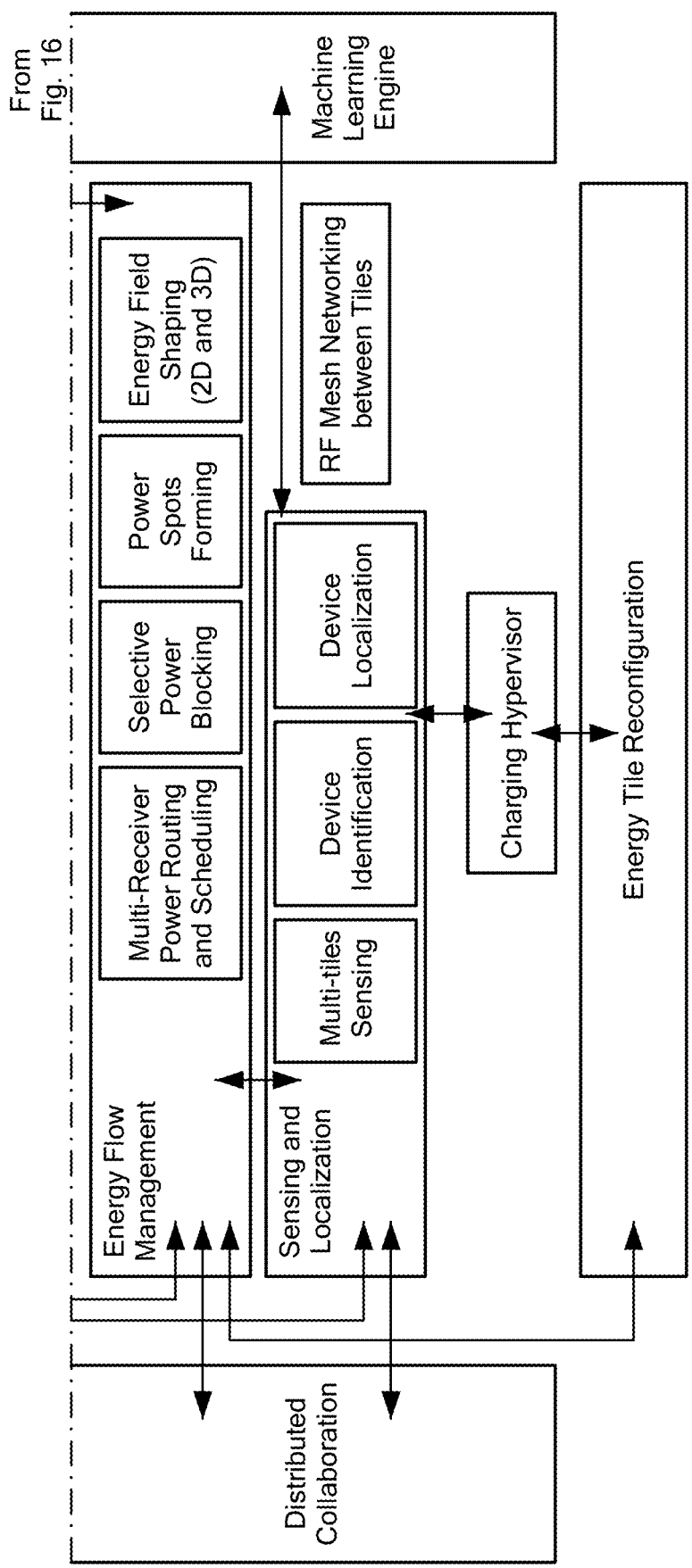

FIG. 16 shows the functional and architectural blocks for software-defined wireless charging of the present embodiments and their cross-module communication and collaboration. These blocks include charging hypervisor, multi-tiles sensing, device identification, device localization, multi-receiver power routing and scheduling, selective power blocking, power spots forming, energy field shaping, location-aware load balancing, charging policy assignment and management, energy tile role assignment, QoS management, charging capacity management, multi-frequency transfer management, power demand classification, interference management, device polling, device authentication, charging handoff and management, mobility/device tracking and management, diagnosis analysis, global energy maps, safety analysis and guarantee, usage profiling, and dashboard/notification.

In some embodiments, the modules and functionalities of software controller may be deployed fully or selectively on the energy tiles as well as remote energy edge nodes depend on their available resources. For example, the relay energy tiles may deploy partly charging virtualization, sensing and communications modules, while the leader tile/s run the full stack modules of operating system, and delegate some modules such as applications to remote energy edge nodes.

In some embodiments, the present embodiments may utilize hybrid models of resource management whereby remote energy edge node and energy tile leaders will collaboratively and dynamically change the energy tiles 138 configurations, and run control plane functionalities.

In some embodiments, each energy tile with role leader has its power connected to an AC socket, while all relay tiles have no connection to AC power. Here, the only sources of power are power amplifiers connected to leader tiles, and the rest of tiles forward the power through software-defined coupling and power routing.

The present embodiments may create a distributed multi-hop charging architecture, dynamic energy network, and support diverse types of devices with different power requirement rates.

In some embodiments, the cognitive energy tiles collaboratively detect and localize all electronic devices within their sensing coverage area, shape the energy field, and route the power toward determined receiver devices, which when used in conjunction with power receivers to charge the electrical devices.

In some embodiments, the cognitive energy tiles 138 create a wireless mesh network with other energy tiles to exchange the control messages, and updates in a broadcast or multihop manner.

In some embodiments, cognitive energy tiles 138 can be reprogrammed on-the-fly by dynamically associating with different configurations, network resources, and charging algorithms.

The present embodiments may enable the energy to be shaped and routed through introduction of software-defined wireless charging network architecture through introduction of software-defined power routing and energy flows, where a software controller/distributed operating system defines the configuration, behavior, and charging operation including power routing and shape of energy field of the system.

In some embodiments, the leader tile may execute energy flow path finding algorithm through software controller that decides the intermediate relay tiles that should participate in the energy routing path. The energy path must connect the tiles over which the charging devices exist.

In some embodiments, the "energy flow management" module 166 may identify the tiles that should block all energy flow over it, and communicated over the control plane by the main leader to all the relay tiles.

In some embodiments, the "sensing" module 156 in the software controller 150 implements the distributed multi-tiles resonance sensing approach. Some embodiments, utilize a dual-coil sensing architecture per energy tile to detect and sense the devices without any direct feedback. Here, there are two nested coils, with AC voltage applied to the inner coil and variations in the induced voltage are then measured across the load in the outer coil.

Some embodiments account for the tradeoff in sensing coverage with power consumption. This is because larger coils cover more of the area, but incur higher power consumption. Smaller coils consume less power, but many more of them must be used for similar sensing coverage. The sensing goal is to detect an object over distance.

In some embodiments, in the dual-coil architecture for contactless sensing, the outer coil acts a resonator relay that sets up a magnetic flux generated by the induced voltage in it, with very little loss compared to directly applying the AC signal to it. When a target object (such as cell phone, laptop, tablet, and UAV) comes close to the surface, the induced voltage in the outer coil changes. These objects, owing to the different levels of component conductive materials, unique alter the induced voltage.

In some embodiments, the "localization" module 158 in the software controller 150 may implement "distributed and collaborative multi-tiles device localization" to determine the location of detected devices. Toward this, it may integrate multiple streams of real-time sensing information obtained from "sensing" module. Here, the software controller 150 combines all per tile sensing information and creates a real-time global sensing map to detect the devices, their sizes, shapes, locations, and to track them over all charging area.

In some embodiments, the energy shaping algorithm may execute by the software controller and shapes the energy over the charging area that is covered by energy fields of all combined energy tiles, through real-time tile configuration adjustments such as impedance.

In some embodiments, the energy shaping algorithm may find optimal energy flow paths (call active energy paths) that deliver power to the devices detected within the charging range, as well as selective energy blocking over all energy tiles that are not on the active energy flows.

In some embodiments, the energy flows may create power spots over a large area to charge multiple electronic devices and null energy at other selected areas.

In some embodiments, one or more energy flows may deliver power to multiple devices over their energy paths.

The present embodiments may utilize a multi-layer reconfigurable energy receiver design where energy receiver has multi-layer of coils and based on receiver load, amount of required power, and location of device the specific number of active coils would be determined.

The present embodiments enable interoperability through support of multiple charging standards through software-defined reconfigurable hardware without need to change hardware, and cognitive energy tiles resources will be allocated based on type, number, and location of devices.

In some embodiments, the software-defined wireless charging architecture enables support future of new changes, standards, charging improvements through software upgrades.

In some embodiments, cognitive energy tiles may be equipped with multiple hardware frontends, e.g., different coils in one layer or at multiple layers, different amplifiers, different RF transceivers, to simultaneously support diverse charging standards and technologies, diverse sensing ranges and accuracies, and different control communication technologies. This enables on-demand allocation of charging algorithms/protocols and resources in one or more energy tiles based on the types, location, and number of devices, and greatly facilitates the wireless charging interoperability, performance, and capacity. This called charging virtualization, and is implemented in "virtualization" module of operation system/software controller.

In some embodiments, the "charging virtualization" module 154 in the software controller 150 enables running different charging algorithms/protocols, and sensing and communication schemes on the cognitive energy tiles and dynamically and remotely change depend on the receiver type and power needs without change of hardware.

In some embodiments, the "charging virtualization" 154 enables creation of multiple virtual power routing/charging networks, e.g., magnetic resonance laptop charging, magnetic resonance UAV charging, NFC wireless charging, resonance charging as-a service network, to share the same physical wireless chargers/energy tiles infrastructure. This may result in unequal resources allocation for multiple charging networks so that they can simultaneously share the same hardware. The addition or removal of a charging service can be deployed on demand and dynamically allocated.

In some embodiments, the "charging virtualization" 154 manages functionalities and software stack on running multiple charging standards as well as charging multiple types of devices with different power requirements using same reconfigurable and cognitive energy tiles hardware. This may result in creation of multiple energy flows at different frequencies or change of charging configurations over the time.

In some embodiments, "energy flow management" 166 may maximize total delivered power to devices as well as system charging capacity with optimal resource allocations. It may collaboratively determine the optimal active energy flows and the virtual charging networks with utilizing other modules in software controller including "power management", "interference management" 168 and "charging virtualization"154. It aims to satisfy the power requirements for all detected devices, given the number of devices, their locations, supported charging protocol/standard per device's energy receiver while minimizing the resource blocks (e.g. total transmitted power, and duration of charging), in the system.

In some embodiments, real-time detection of device type along charging standard, and power requirements classification of devices enable the present embodiments to categorize the energy flows into different QoS classes and facilitate differentiated resource provisioning, service-based pricing, and infrastructure as service implementation.

The "energy flow management" module 166 allocates a QoS class to each active energy flow based (i) detected devices profiles including current locations, types, and numbers of devices as well as historical learned device charging patterns that may be obtained from the "devices profiles"170 and the "machine learning engine" 162 modules.

In some embodiments, the software-defined architecture enables to separate wireless charging functionalities from hardware infrastructure.

In some embodiments, the software-defined architecture enables real-time remote management and monitoring of charging operation over surface and 3D area, and improves resource utilization.

In some embodiments, the wireless charging and sensing operations, configurations, and algorithms are implemented in software and thus can be dynamically changed accordingly to the number, type, and location of devices.

In some embodiments, the software-defined wireless charging architecture simplifies system management, reduces deployment cost, and enables real-time and fast system adaptation to any changes in terms of location of devices, number of devices, and environment.

The present embodiments can operate at multi-frequency power transfer mode, where more than one energy tile 138 acts as leader and each leader operates at a different frequency resulting in increase on (i) total charging power capacity, (ii) number of parallel charging devices, and (ii) efficiency of interference management.

The present embodiments may re-use charging frequencies to increase system charging capacity.

In some embodiments, software-defined wireless charging architecture can include multiple features such as on-demand reconfigurability, charging virtualization that enables support of multi-standards, large area charging capability, and multiple-device charging support realize deployment of wireless chargers as a service on different infrastructures such as furniture (tables, desks), walls, and objects, rather than just a hardware.

In some embodiments, the present embodiments may tend to maximize the charging capacity for large area and multi-device charging. The software controller 150 has the collective information from all networked coils that sense and cover the charging area. By considering this network-wide information the energy shaping and power routing algorithms may consider all possible power routing decisions over the large area and greatly maximize the multi-device charging capacity and minimize the power interference. Additionally, the software controller 150 can jointly allocate resources such as frequency, algorithm, and energy tiles configurations to achieve optimal network-wide large-area system performance. In addition, this network-wide information enables fast failure recovery, real-time power re-routing, and seamless mobility management.

In some embodiments, the "machine learning engine" module 162 in the software controller 150 can enable applying/running machine learning powered algorithms for different objectives such as device sensing, detection, localization, and tracking as well as charging resource management including finding optimal energy paths, power management and balancing, interference management, and device authentication. The machine learning engine module 162 can be trained to determine the location of the device, and a corresponding device type of the device from a plurality of device types based on the plurality of sense voltages.

In some embodiments, the software controller can reduce power transmission by at least one transmitter in at least one path by tuning the impedance of such transmitter. In some embodiments, power transmission by at least one transmitter in at least one path can be canceled by configuring at least one transmitter of the array of transmitters to reflect a power signal from the master transmitter back along said at least one power path. The controller can also establish a revised path in response to a change of device position of a device from an initial device position to a subsequent device position.

In some embodiments, the "machine learning engine" 162 module enables modeling and learning of device and user charging behaviors and patterns such that those learnings may optimize the energy consumption of the system, improve the sensing and localization accuracy along the responsiveness (reduce delay) of device detection and charging.

In some embodiments, "energy flow management" module 166 in the software controller 150 can manage resource-efficient creation of energy flows to charge multiple devices over the sensing/charging areas. The functionalities of this module include efficient and optimal power routing, selective power blocking, and creating energy spots.

In some embodiments, the "power management" module 164 in the software controller 150 maximizes the charging capacity in terms of allocating charging frequencies, budgeting the required power and other QoS performance metrics for each detected device and per energy flow, classifying the power demands requirement, and implements device and location-aware load balancing between energy tiles.

In some embodiments, the "interference management" module 168 in the software controller 150 minimizes different types of interference "between energy tiles", "energy tiles and devices that being charged", "energy tiles and humans". This module may operate closely with the "power management" module 164.

In some embodiments, the "devices profiles" 170 module in the software controller 150 may create and manage specific profiles for each detected device with diverse fields such as device type, size, ID, required power, charging patterns/history, and current and previous locations of devices within the sensing area that are obtained from the "localization" module 158, and provide them to the "devices mobility" 174 and the "devices authentication" modules 172.

In some embodiments, the "devices authentication" module 172 in the software controller 150 may mange the initial negotiation and authentication of a detected device on the sensing area before any charging starts, and accordingly initiate/update a charging policy for each device. This enables to define different permission policies, limits and constraints, and QoS per device. Additionally, this may facilitate deployment and use of software-defined charging as a service in private and public infrastructures.

In some embodiments, the "devices mobility" module 174 has functionalities such as: (i) tracking active energy flows that charge each device, and (ii) re-route the energy flows when a device moves from one location to other location within in the sensing/charging area. This module may work with the "localization" module 158 to get the current and previous locations of detected devices, and the "energy flow management" module 166 to get the active energy flows, and facilitate the re-routing energy flows. Additionally, this module may utilize and combine cross-layer information from the "machine learning engine" 162, the "devices profiles" 170, the "devices authentication" 172, and the "sensing" modules 156 to improve accuracy and responsiveness of tracking.

In some embodiments, the "devices mobility" module 174 in the software controller 150 provides the mobility pattern, new location and predicted locations of a mobile device to the "energy flow management" module 166, and accordingly the active energy flows and energy paths might change by re-configuring the energy tiles.

In some embodiments, the "devices mobility" module 174 may utilize the global information in software controller to achieve global re-routing optimization over all devices within charging area when one or more devices move from one location to other locations. It may optimize re-routing of energy flows to achieve per-energy flow QoS guarantees along seamless and continues charging of each device.

Additionally, the predictive devices usages obtained from the "devices profiles" 170 along mobility predictions may be helpful for re-routing optimization.

In some embodiments, the software controller 150 may have applications layer in form of add-on software that enable additional monitoring, management, maintenance, and optimization tools, based on use case scenarios. These add-ons software 176 may install on edge energy node or on other remote monitoring/management interfaces such as mobile, tablet, or web.

In some embodiments, the add-on application 176 may include "diagnosis analysis" to record, monitor, and analysis issues such as operational faults, over heat, high initialization delays, control and communication messages lost, low charging speeds, and localization errors.

In some embodiments, the software controller add-on application 176 may include "real time safety check" that continuously analyzes location of devices, active energy flows, and make sure the intensity of magnetic and electric fields are not passing the safety regulations, and may suggest specific energy blocking areas to "energy flow management" module 166.

In some embodiments, the software controller add-on application 176 may include "dashboard and notifications" that present real-time system statistics in terms of charging performance, active energy flows, active energy map, as well as statistics of detected devices. Additionally, this module can be used as an inference for user interactions to configure and manage system parameters, and give feedback.

In some embodiments, the software controller add-on application 176 may include "usages profiling" that record and learn the usage patterns including common detected locations of charging, common charging requirements and types of devices, and common mobility patterns.

Figure 17:
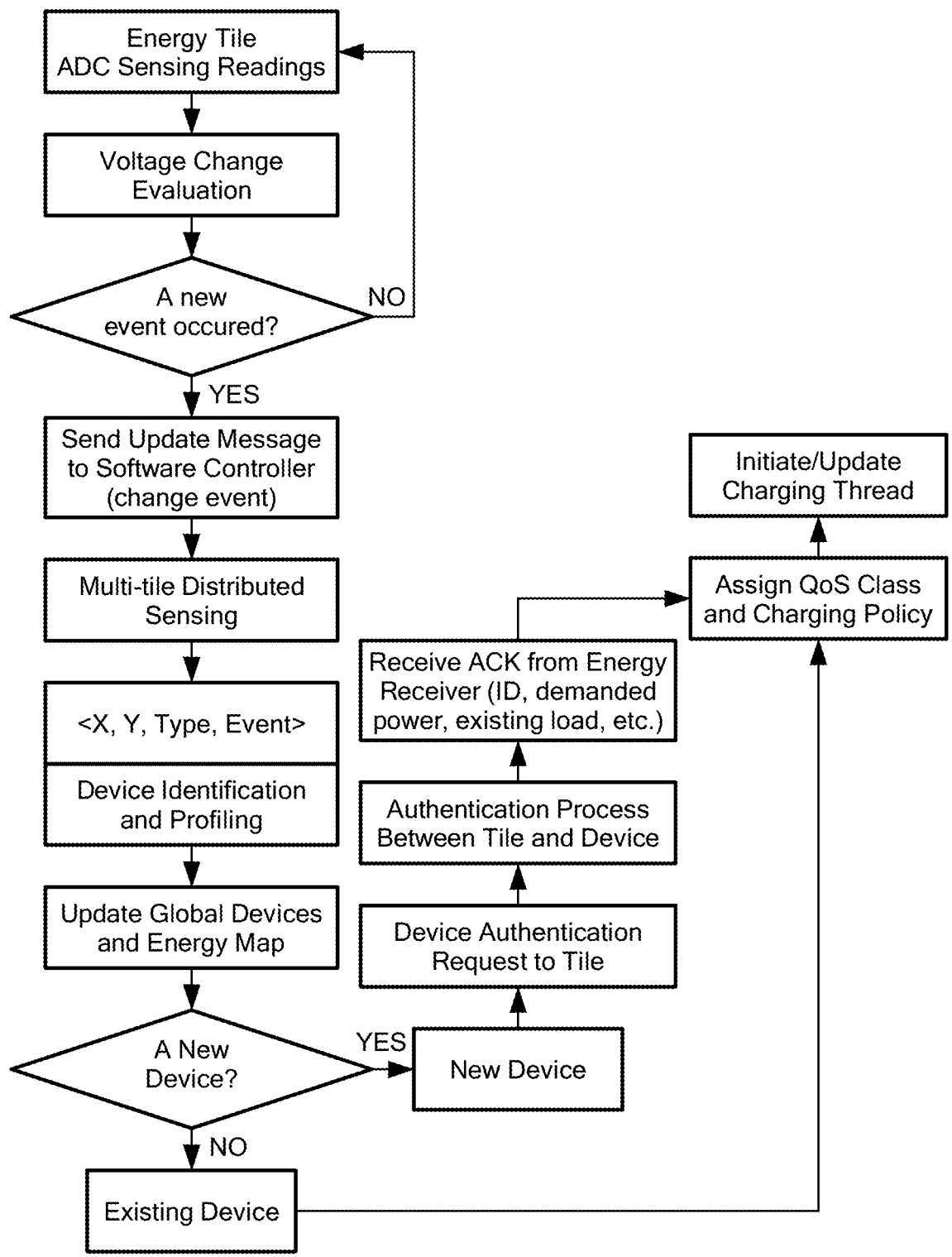
FIG. 17 illustrates wireless charging thread initialization and re-configuration process.
Figure 18:
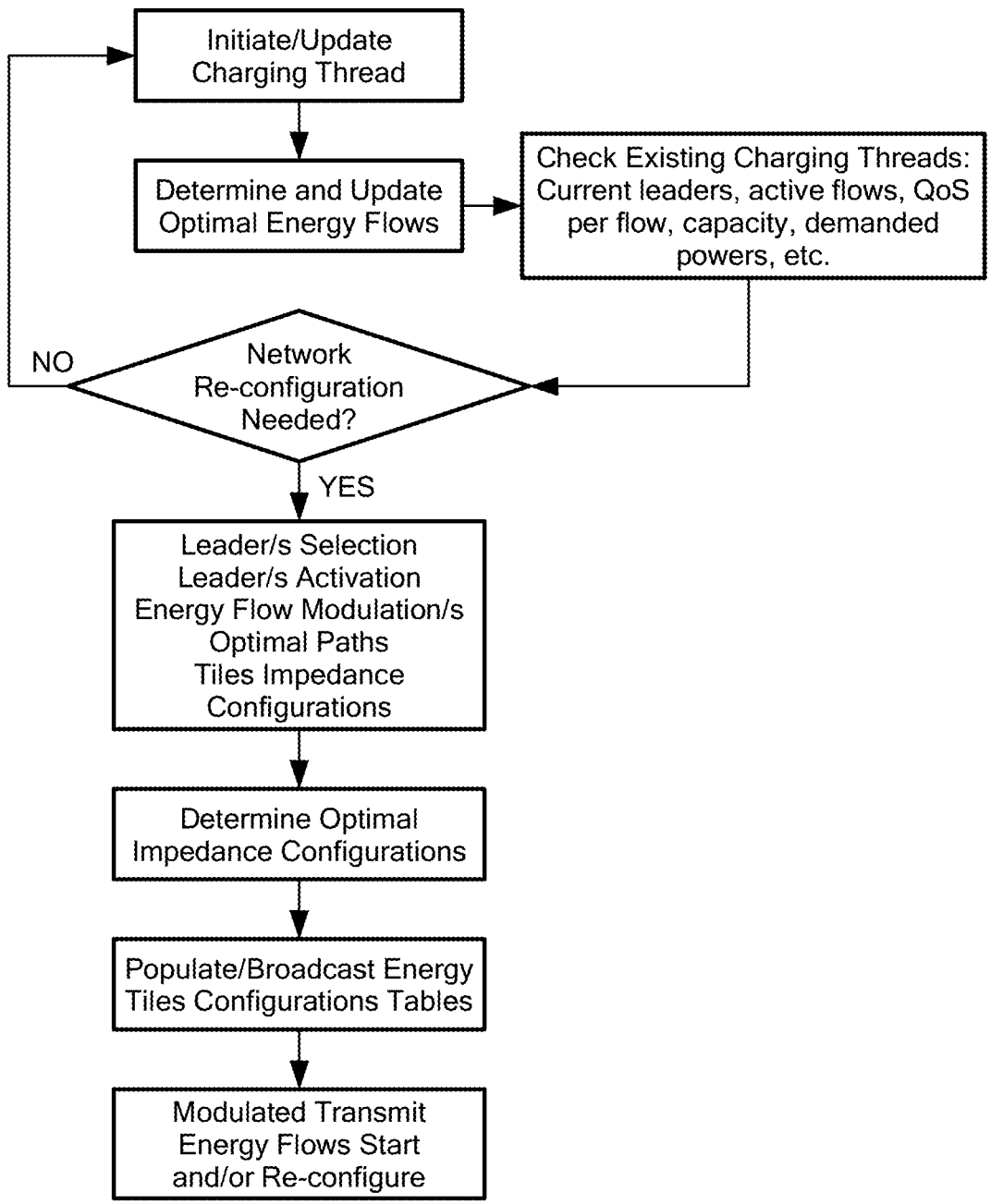
FIG. 18 illustrates software-defined energy flows re-configuration process.

In some embodiments, as shown in FIG. 17 and FIG. 18, the method for software-defined wireless charging can include: (i) the leader energy tile initiates the setup control messages to create a mesh network and the relay energy tiles may join this network. In the case of multiple leaders one leader will be selected through the leader selection algorithm to create the mesh network, and track/manage other tiles. (ii) each energy tile continuously senses any device/object in its sensing range through a low-power out-of-band resonance sensing approach, and upon detection of a new device, detection of device moving, and removal of an existing device send the update messages through software controller. The global information of all cognitive energy tiles together enables software controller to perform area sensing, device localization, device identification, and device tracking accurately and with low-power, (iii) Upon any changes in each tile's sensing area such as addition, removal, movement of a new device software controller determines one or multi optimal energy flows based on power requirement and location of devices, to maximize the capacity and efficiency of wireless charging, (iv) based on determined energy flows software controller finds the configurations of all active energy tiles and configure them remotely though update control messages, to shape energy field and route the power toward the devices, (v) the reconfigurable multi-layer energy receiver attached to device may monitor the load of the device and select energy receiver coil layers to adjust the received power on real-time to the load, protect from over-voltage, and avoid the impedance mismatch.

Figure 19:
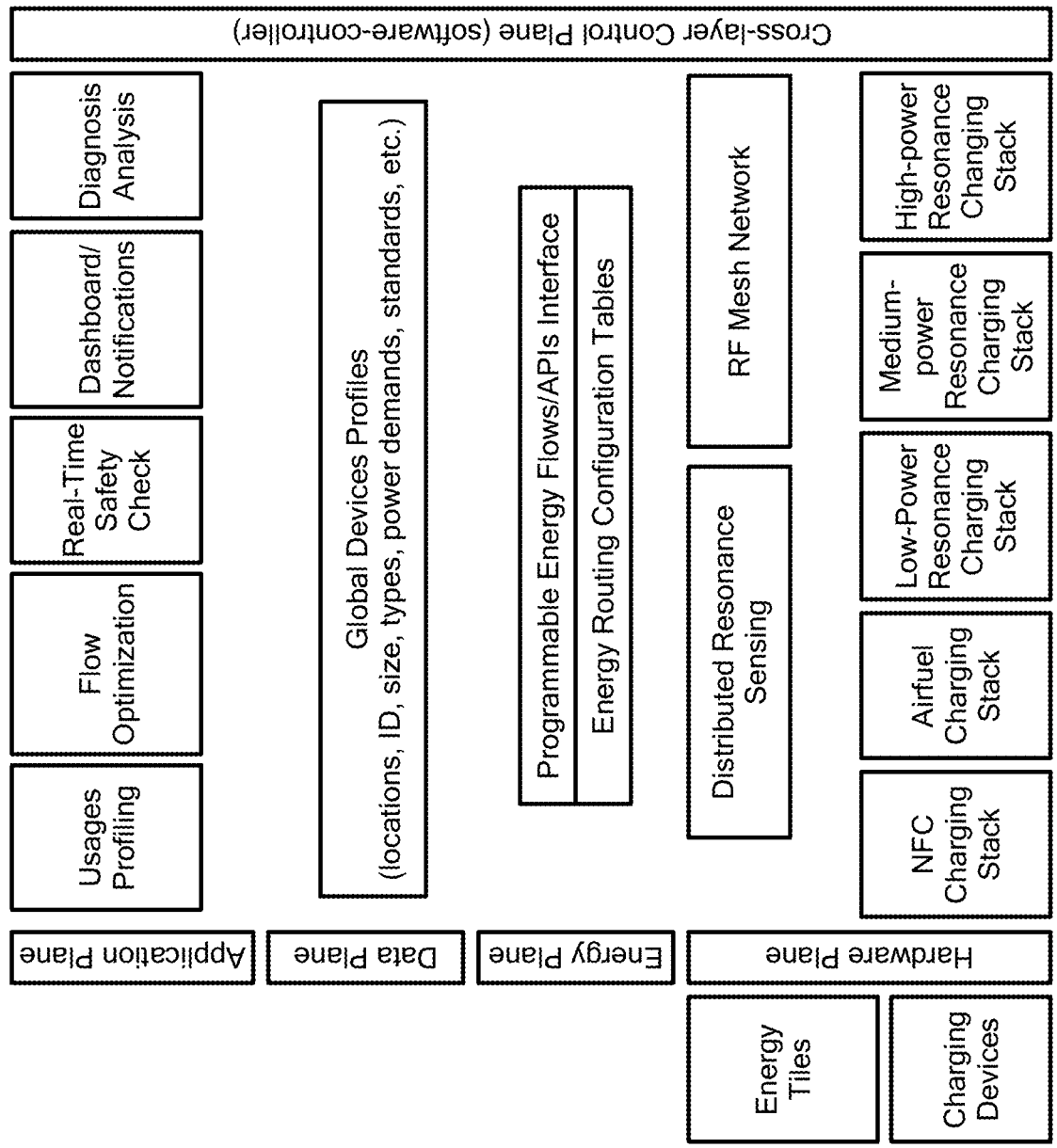
FIG. 19 shows overview of five operational planes and their components for the proposed system.

FIG. 19 shows the architectural planes 180 of the present embodiments which include: application plane 182, energy plane 184, data plane 186, control plane 188, and hardware plane 190.

In some embodiments, the energy plane includes "programmable energy flows" that could charge devices and be customized, forwarded, shaped through software controller.

In some embodiments, the data plane includes an "energy tile configuration table" 192 that may contain configurations such as current impedance of the tile, active charging protocol of the tile, location of detected devices, and required power per device.

In some embodiments, the control plane may include "communication and control channels" as well as "distributed operating system (software controller)" with functionalities such as networked coils management, charging virtualization in forms of "software charging" that may implement different wireless charging protocols/standards, power management, and energy load optimization tools.

In some embodiments, the hardware plane may include all hardware components that include sensing coils, charging coils, amplifier, cognitive energy tiles mainboards, and energy receiver hardware.

In some embodiments, the separation of energy, data, control, and hardware planes enables sensing, charging, networking functionalities and algorithms, power management, and new applications to be easily, continuously, and independently upgraded without the need of costly changes of hardware.

In some embodiments, the present embodiments have in-band energy channels, out-band sensing channels, and out-band control channels. In-band energy channels may be utilize for transfer of magnetic resonance-based power, out-band sensing channel may be utilize for sensing and tracking objects/de devices over the distance, and out-band control channels may be utilize for exchanging control messages between cognitive energy tiles 138 and between energy tiles 138 and minoring devices.

In some embodiments, s cooperativeness through joint control and optimization of cognitive energy tiles is enabled to enhance the charging effectiveness and capacity.

In some embodiments, each energy tile hardware includes a mainboard, dual active-passive sensing coils, and a charging coil. The mainboard of relay may include of microcontroller, sensing/charging hypervisor, radio communication module, impedance adjustment circuit module, sensing circuit module, backscatter communication module, and mainboard of leader has all components as relay with addition of an amplifier.

In some embodiments, each individual energy tile may sense objects, route, block, shape, and share power, and communicate with other devices.

In some embodiments, the software controller 150 may have the global information of location, types, number, and energy demands of all devices within the sensing range of the system. Utilizing this information, the software controller 150 can determine the most power-efficient energy flows in such a way that system charging capacity is maximized. This may result in maximizing the end-to-end transfer efficiency among all energy flows, minimizing the energy interference in the system, while satisfying per-energy flow QoS performance and delivering the required power per device.

In the following detailed description, reference is made to the accompanying drawings, which form a part hereof. The drawings are not to scale or to proportion and the illustrated embodiments described in the detailed description and claims are not meant to be limiting. Other embodiments may be used and/or and other changes may be made without departing from the spirit or scope of present embodiments. Further, additional details about device sensing and charging using networked coils are provided for in a PCT Application entitled "Device Sensing and Charging Using Networked Coils," having common inventorship and filed on an even date herewith, the disclosure of which is incorporated by reference herein in its entirety.

Figure 20:
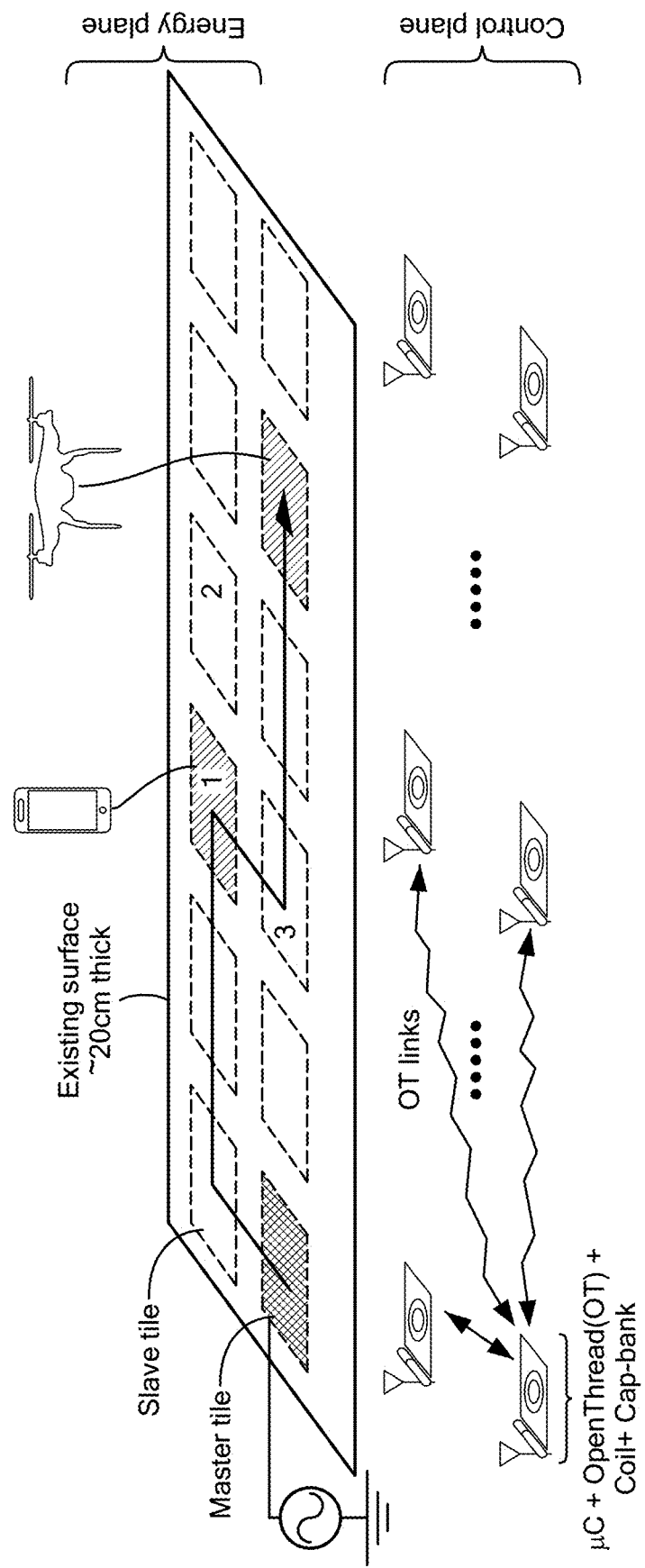
FIG. 20 illustrates a 2D example for energy tiles on the under-side of a given surface. Multiple number and types of devices, from UAVs to phones, can be charged through contactless energy-on-demand device localization and adaptive energy hopping across tiles.

FIG. 20 shows an example of 2D energy tiles 138 that can be attached on the under-side of a given surface. Multiple number and types of devices, from UAVs to phones, can be charged through contact-less energy-on-demand device localization and adaptive energy routing across tiles. The present embodiments use magnetic resonance but limits the range of a given coil by placing a large number of them in two dimensions. A single coil, a wireless network interface connected to a low-power micro-controller, and a dual capacitor bank together compose a so-called energy tile. Only the leader or master tile has its own power amplifier and connected to an AC socket, while all other slave tiles have no connection to AC power. Reconfigurable energy tiles attach to the underside of the table surface, and form a wireless mesh network control plane. This allows the tiles to perform coordinated sensing and deliver energy in a cooperative manner anywhere around the table surface in the energy plane. The software defined framework that executes in the leader tile allows localization of the object to the closest tile, detect the type of object, and then deliver energy to that specific tile (or multiple tiles in case of more than one object) through the concept of energy hopping/routing over tiles. Since all relay tiles are passive in the sense that they lack power amplifiers, this modular design and energy distribution method is easily extensible to any surface area.

Additionally, the charging and sensing of the present embodiments can be integrated in forms of charging pads for portable personal charging solution. Further, the receiver can be integrated into tablets and laptops in computing segment, smart watches, wireless earphones, fitness trackers, smartphones, integrated furniture, and power banks in mobile ecosystem segment, drones and robotics applications in robotics segment, smart speakers, camera, door-locks, IoT sensors in smart home segment, car interior and electric vehicles in automotive segment, in kitchen appliances, robotic vacuum, electric toothbrush, and power tools for appliances segment, and in smart glasses, earphones, hearing aids for wearables segment.

Sensing and charging systems and methods as described above can be applied in various configurations. In certain embodiments, they may be applied to UAV charging solutions. Nested coil systems, as described above may be included in a charging pad or mat. For ease of transport, the mat may comprise two or more portions that may be connected together via a hinge or other mechanism to allow a mat with relatively large surface area to be folded or otherwise reconfigured to reduce its overall length and/or width, as described further below.

FIG. 21 illustrates an exemplary embodiment of a system 2100 for charging unmanned aerial vehicles (UAVs). The system 2100 can include a pad 2101 having an aerial vehicle 2103, or UAV, disposed thereon. The pad 2101 can be a surface on which the aerial vehicle 2103 lands as well as a charging source that provides power wirelessly to the aerial vehicle 2103. The pad 2103 can be a portable on-demand wireless charging system that can autonomously guide and charge multiple UAVs simultaneously. Charging occurs in a hands-free manner post landing through induction-based coils, with tight software control and coupling with an operating system for authentication, as discussed further below. It will be appreciated that, when compared to magnetic resonance and conductive based solutions, induction-based charging provides safer, lighter, and cheaper variants for obtaining energy.

The pad 2101 may be foldable along a hinged portion 2105 to provide for easy portability with each half including multiple nested coils that are used both for the sensing of one or more receiver coils of the landed UAV 2103 and to provide charging energy to those receiver coils. For example, the pad 2101 shown in FIG. 39 can include two sections separated by the hinged portion 2105, but additional sections may be included (e.g., 3, 4, 5, 10, 15, 20 or more) depending on the coupling mechanism for the sections and the specific application.

Intelligent adaptive power management allows the UAV 2103 to be charged wherever it lands on the pad 2101 since no precise alignment between the receiver coils and the charging coils is required. The pad 2101 may include a controller (not shown) that can communicate with each nested coil and determine the location of each wireless charging receiver (e.g. a charging foot as described below) and then direct the charging energy to follow a path to the closest nested coil, hopping though intermediate coils with very little energy loss. In certain embodiments, discrete tiles that are structured to both physically and electronically couple to surrounding tiles may be used to allow for nearly infinite expandability and configurations. Such tiles may be any shape including, triangles, rectangles, pentagons, hexagons, etc.

A person skilled in the art will recognize that the pad 2101 can be shaped to allow multiple numbers and types of UAVs 2103 to charge anywhere along the surface of the pad. While in some embodiments, each sensing coil of the plurality of coils along the pad 2101 can be activated to ensure charging of the UAVs, the pad 2101 can be configured to activate only those coils that contact the UAV to aid in efficiency and minimize energy loss, with each coil consuming approximately ⅓ W for sensing along 20 cm$^2$ along the pad. It will be appreciated that the same sensing outcomes can be achieved using a fractional number of inductive coils, with a novel dual-coil design and when a deep neural network is trained on voltage variations observed on a combination of these coils. The pad can be made from a carbon fiber hydrographic material.

Figure 22:
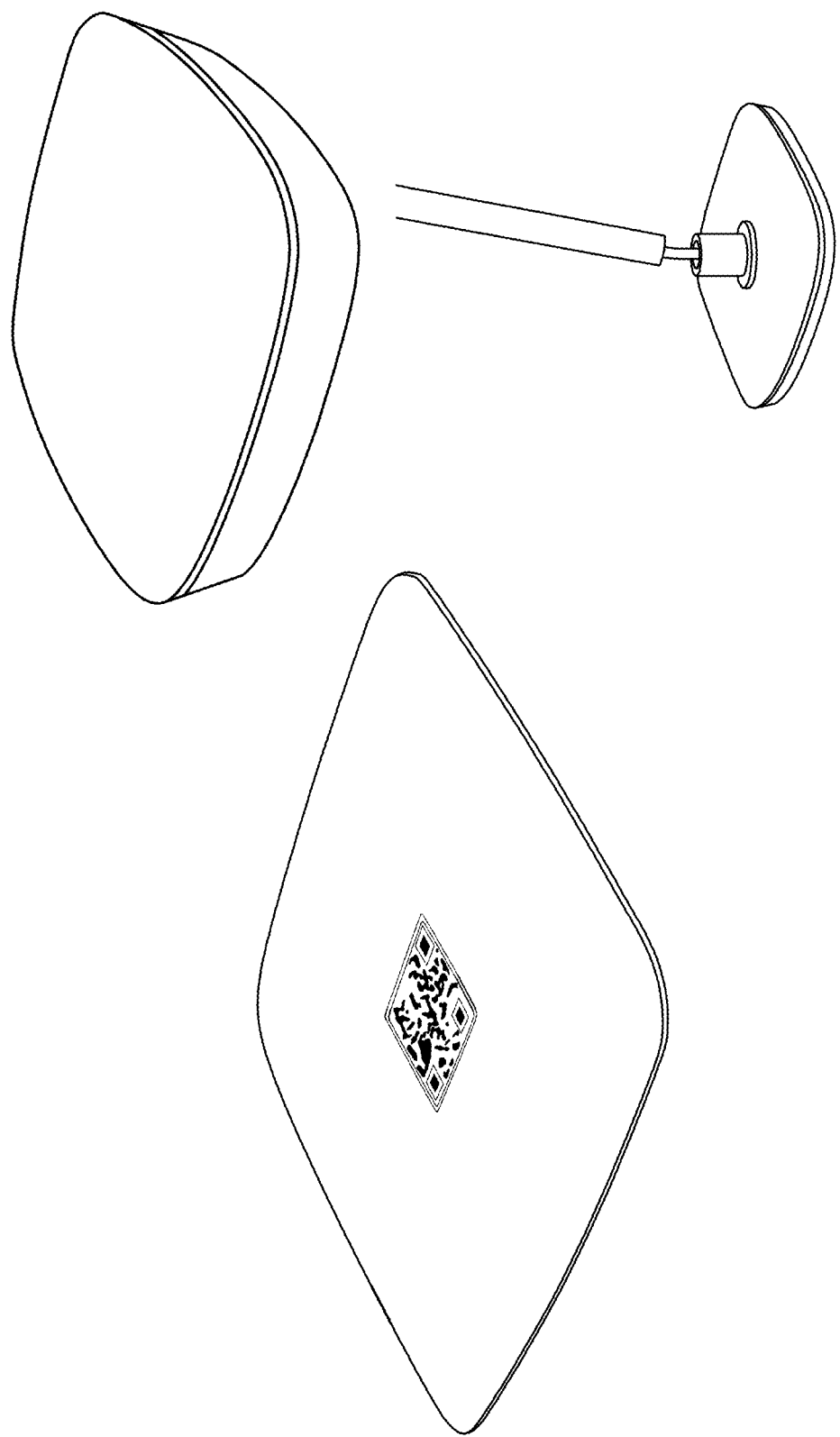
FIG. 22 illustrates an exploded perspective view of the components of the system of FIG. 21.
Figure 23:
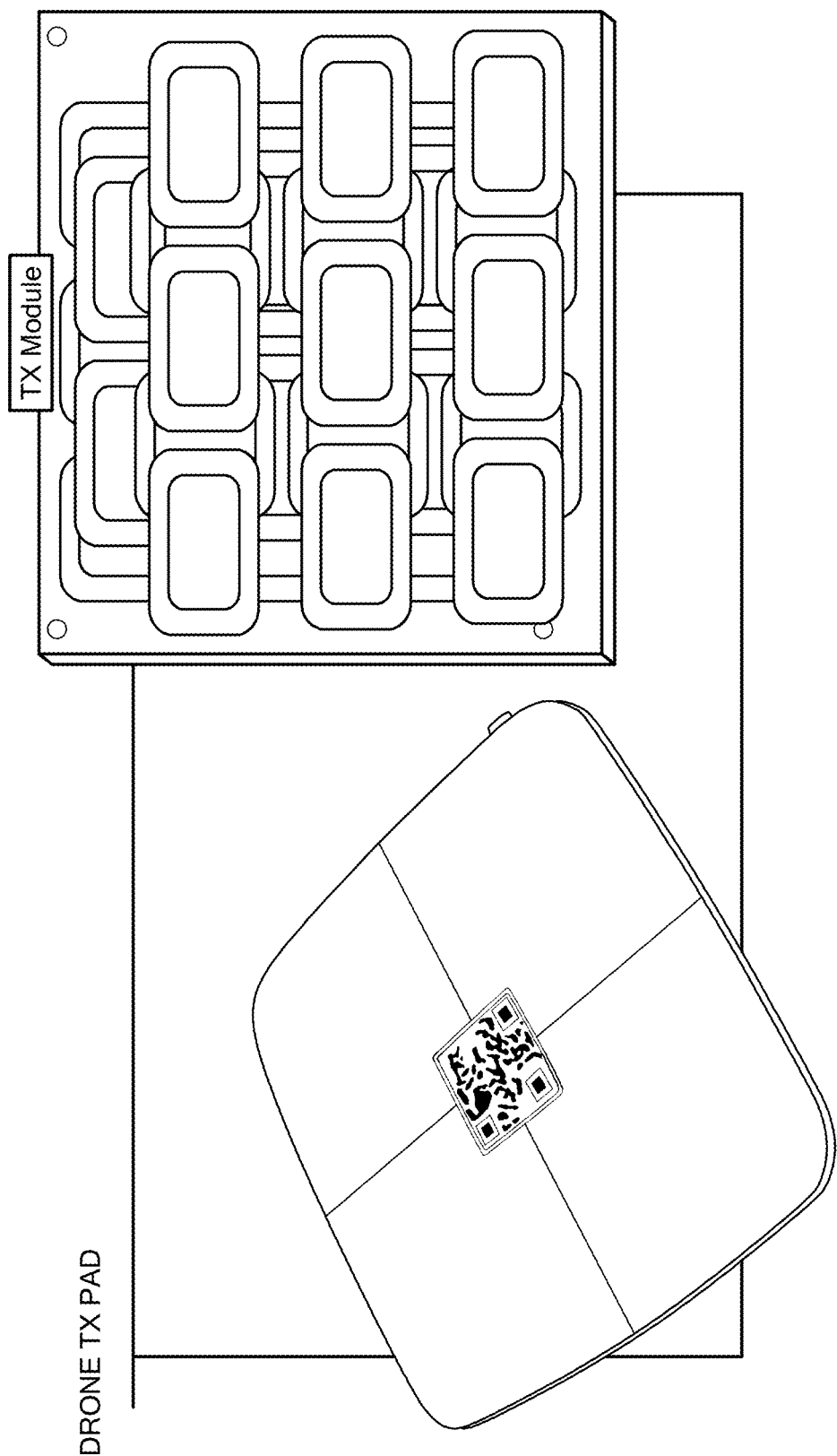
FIG. 23 illustrates a schematic of the pad of the system of FIG. 21 having a plurality of coils illustrated.

The system 2100 can include a charging foot 2109 coupled to one or more legs of the UAV 2103. While some applications may be able to adequately charge the battery if the UAV through a single receiver coil on the UAV, in certain embodiments the UAV charging foot 2109 may be provided as a companion to the pad 2101. An exemplary charging foot 2109 is shown in FIGS. 21 and 22. The UAV charging foot 2109 can be a mechanical foot that includes a shock dampener 2107 to ease stress during landing. At the end of the charging foot 2109, a pad may be located comprising a receiver coil and circuitry to regulate energy received by the coil to a charging voltage level that can be provided to the battery of the UAV. Wiring 2111 may run internally or externally up the leg to the main body of the UAV 2103 or to wherever the battery is located to provide charging current. It will be appreciated that each landing leg of the UAV 2103 could be fitted with a charging foot 2109 which could decrease the charging time of the battery of the UAV as the power would be received by the UAV 2103 through each of the legs. For example, to increase the rate of charge and thereby decrease charging times, multiple charging feet may be fitted to a UAV such that each point of contact with the landing pad acts as a charging receiver. This charging rate may be further increased based on the structure of the landing pad and its multiple coil layout. Depending on the size and orientation of the coils in the pad and the size and orientation of the UAV and its charging feet, the UAV may draw power from multiple different coils simultaneously. For example, as shown in FIG. 23, the pad 2101 includes a plurality of coils 2112 which, when contacted by the UAV 2103, can charge the UAV. Charging can therefore occur anywhere along the pad with up to a 150 W/UAV rate. The modular nature of the charging feet 2107 can allow retrofitting to existing UAVs to enable wireless charging. Additional features may include lights fitted to the charging feet that are powered by the landing pad and can be used to indicate successful wireless charging and/or charge status.

The system 2100 can include a backpack 2113 that can serve as an operating system for the components discussed herein. FIG. 22 illustrates one embodiment of a backpack 2113 that can be configured to be retrofitted to the UAVs 2103 to allow for real-time authentication. For example, in some embodiments of autonomous charging, authentication of the UAV to ensure that only authorized UAVs are able to utilize a specific charging pad may be desired. Authentication mechanisms described herein can also be used as a handshake to mutually identify both the UAV and the charging pad to each other. Such protocols may be of particular importance in applications where the landing pad takes over flight controls of the UAV to guide landing.

In some embodiments, the backpack 2113 can be an operating system that runs a suite of advanced algorithms (called FlyOS) for authentication of signals transmitted by the wireless radio controller and/or the pad 2103. The FlyOS can serve as a secondary layer of authentication that is impervious to software-based takeover of the wireless link between ground-based control devices (i.e., pad/remote control) and the UAVs. FlyOS can allow for on-demand sensing and charging implementation as well as charging voltage, current, and safety monitoring. When a software-based takeover of the wireless link occurs, the backpack can raise alerts anytime a spurious signal is detected. The alert can be an audible signal, e.g., a siren, a flashing light, and other alerts known to a person skilled in the art.

The algorithms of the backpack 2113 can perform data pre-processing and include a framework of machine learning algorithms that can learn subtle transmitter-side signal distortions that are injected within the processing chain due to typical manufacturing process variations, which can be referred to as RF fingerprinting. While traditional authentication techniques such as passwords and cryptographically-signed tokens may be used, in some embodiments, the RF fingerprinting technology that could augment, or even replace, traditional authentication techniques for this application. Each RF transmitter has unique characteristics due to manufacturing process variations. Charging pads or coils of the instant embodiments may include an RF receiver operable to analyze the RF characteristics of the transmitter in an approaching UAV to identify the unit and determine charging permissions as well as charging characteristics (e.g., power requirements). In certain embodiments, charging pads may use machine learning-based algorithms to determine whether the UAV is authorized to use the charging pad based on its RF signal.

Figure 24:
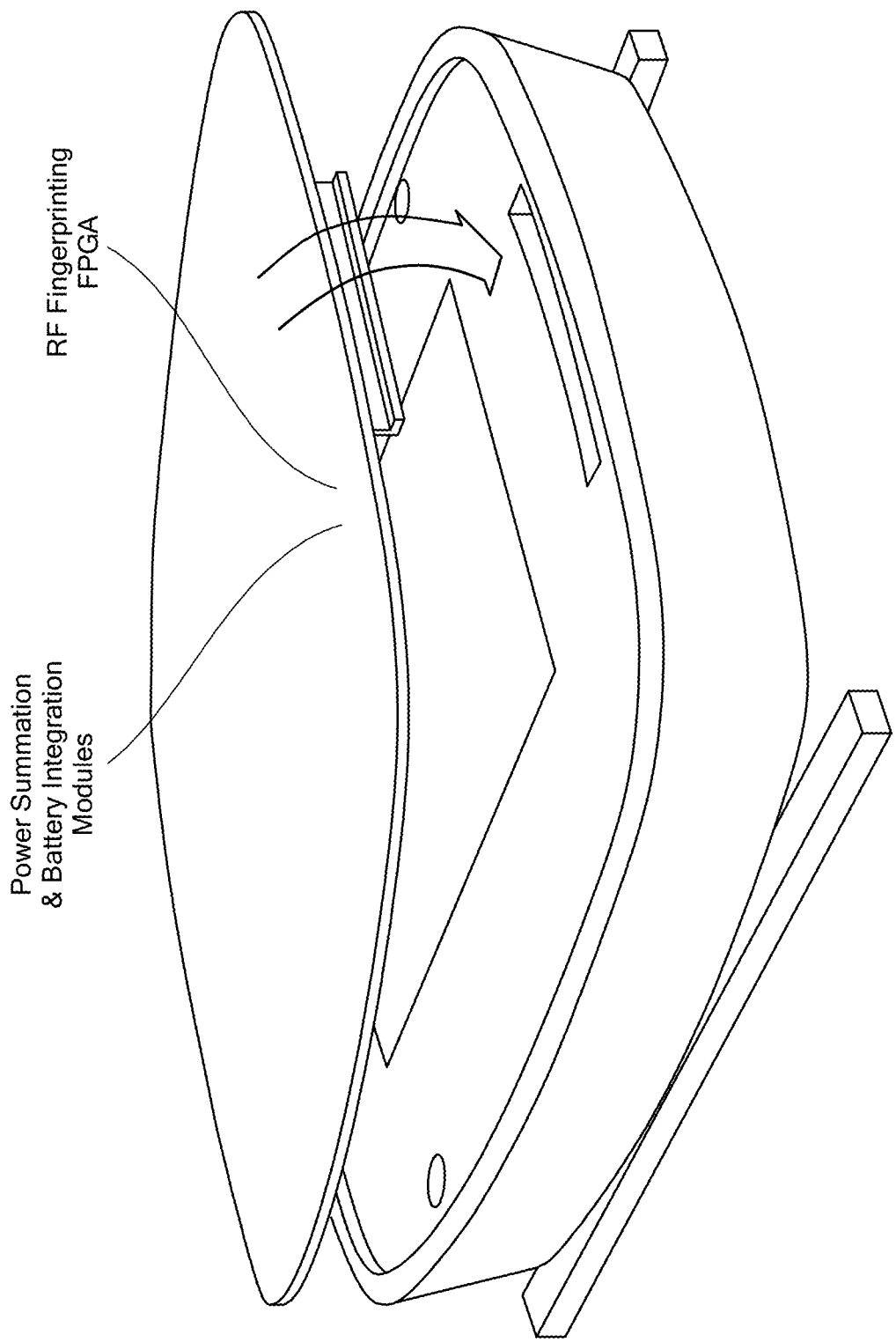
FIG. 24 illustrates an exemplary embodiment of a backpack of the presently disclosed embodiments.

RF fingerprinting, as shown in FIG. 24, can be impacted by the wireless channel, and thus RF signatures learned in static conditions may be distorted beyond recovery over the air. To make a robust signal classification pipeline, methods of combining deep neural networks, specifically deep convolutional neural networks (DCNNs) with the steps of (i) data augmentation, and (ii) intentional distortion of the Tx signal can be used. Data augmentation involves taking the training set of the pad/controller generated signals and passing them through thousands of realizations of the wireless channel. Alternatively, the transmitted signals can be intentionally distorted such that the bit error rate is contained within a 5% reduction threshold.

The UAVs 2103 can land onto the pad 2101 using cameras. Other solutions can involve light-based ranging (LiDAR) have also been proposed. Further, RF-based solutions can operate and land in dark and non-line of sight situations to allow for more freedom when landing the UAVs. A combination of multiple mmWave radars can be installed within the pad as a software suite to remove false positives of the obtained point cloud of reflected signals. A secondary layer of localization can explore the use of Wi-Fi based beamforming using Wi-Fi adapters both in the backpack 2113 and the pad 2103. Classical 802.11ac/ad Wi-Fi devices use beamforming to direct signals to specific receivers, and thus must perform a sector-sweep to lock the optimized direction. The same technique will be leveraged to enhance the positioning of the UAS, thus complementing the mmWave radar approach. In some embodiments, handoff mechanisms and real-time control algorithms for gentle but precise landing can be used for a dual-mode landing method.

Experimental results with off-the-shelf mmWave sensors, such as TI AWR1443 sensor, indicate that they work with (i) limited range, and (ii) show different accuracy levels at different azimuth/elevation angles. Moreover, they generate a vast number of location points due to the 4+ turning motors/blades of the UAS, most of which are false positives. Real-time processing of the entire point cloud can be performed to estimate the most likely single location of the UAV. In addition, optimal heights at which the Wi-Fi-based beamforming method is most beneficial can be determined, and when the handover must occur to the mmWave sensor.

In certain embodiments, landing pads may generate a signal or include markings readable by a UAV to allow for the UAV to identify and locate the charging pad and to aid in positioning during landing. In some embodiments, the landing pad may be operable to take over the flight controls of a docking UAV to guide in to the proper landing location for charging. To accomplish this, the landing pad may include one or more of a processor operable to generate commands, a transmitter capable of sending control signals to the UAV and/or receiving information from the UAV (e.g., video signals or location information), and sensors for locating and tracking the UAV during approach (e.g., cameras). When landing, the voltage in fewer but larger coils are affected to different extents when a device is placed in proximity, which allows for more targeted charging.

Figure 25:
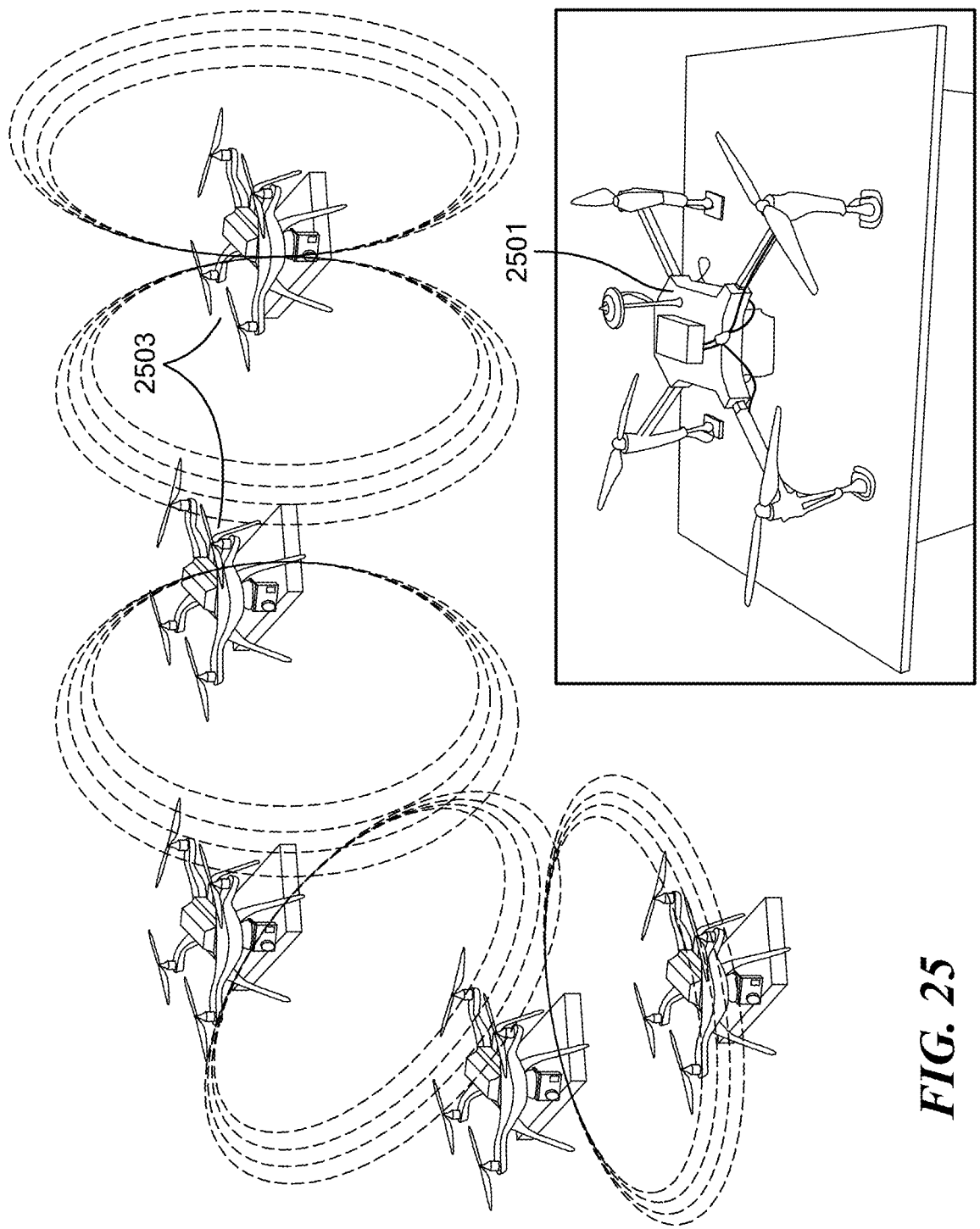
FIG. 25 illustrates a UAV to UAV wireless charging method according to certain embodiments.

As noted, the device locating systems and methods described herein allow the determination of device locations and can provide charging energy without precise alignment. Building off of these abilities, certain embodiments include UAV to UAV charging systems without precise alignment. For example, a swarm of UAVs may all include customized field programmable gate array (FPGA) hardware and one or more nested coils which may be implemented on a multi-layer printed circuit board (PCB) which may be adjustable on-the-fly to be aimed in different directions. An exemplary UAV to UAV charging swarm is shown in FIG. 25. Multiple nested-coil-equipped UAVs 2503 form a swarm, each carrying a charging pad comprising one or more nested coils as described above. This allows for real-time sensing of the relative positioning of the UAVs in the swarm and a UAV 2501 to be charged by the swarm 2503 of UAVs.

Figure 27:
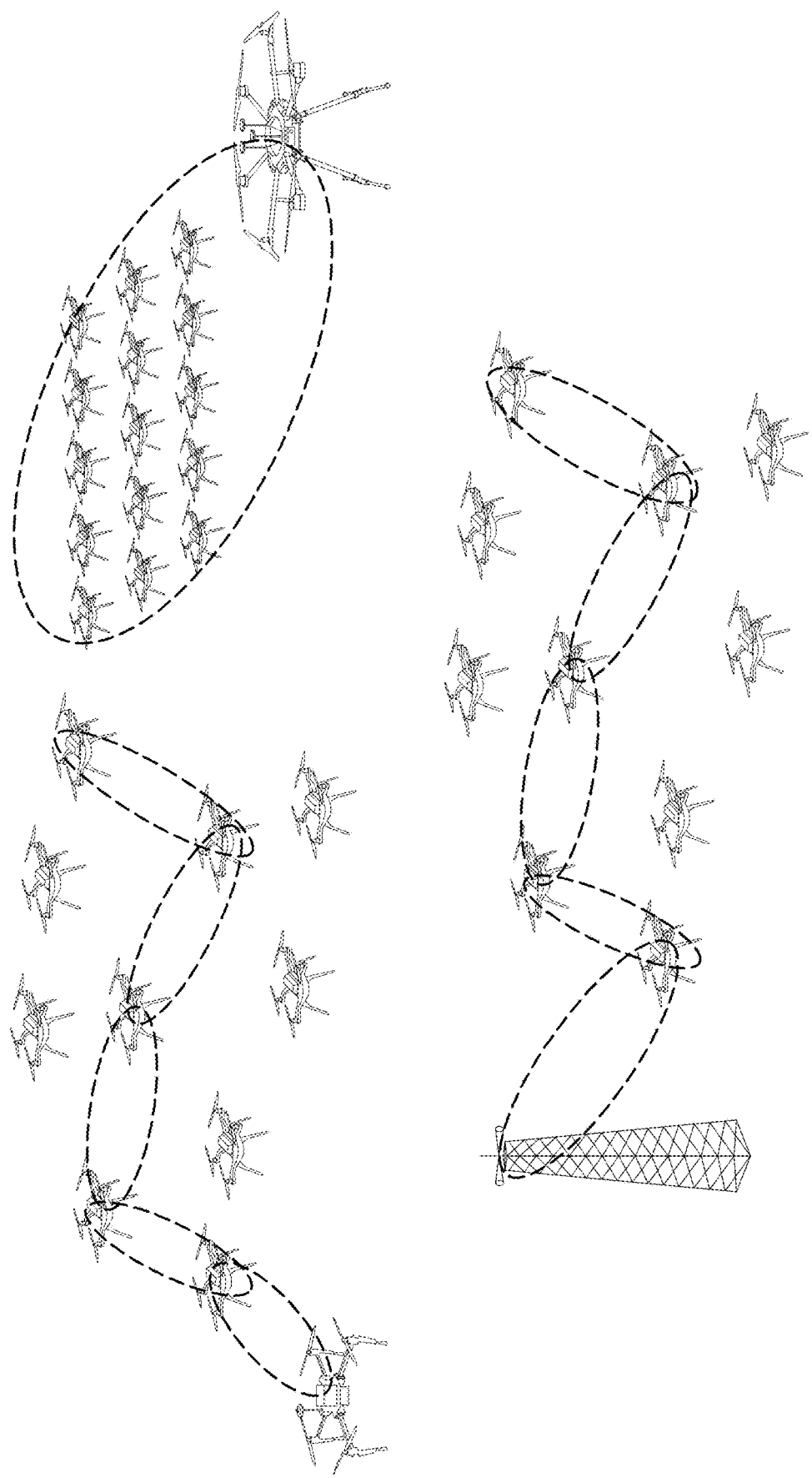
FIG. 27 illustrates an exemplary embodiment of charging by wireless hopping between UAVs or from a transmitter tower.

FIGS. 26 and 27 illustrate other embodiments of UAV charging in swarms while in flight. As shown, the charging can be performed ad-hoc or peer-to-peer. The UAVs can provide charge to a neighboring UAV in flight, or can transmit energy through a UAV to a peer UAV. For example, a location of a second aerial vehicle from the one or more additional aerial vehicles is sensed via a change of electromagnetic field, sensed voltage, or radiofrequency signals of one or more of the resonant coils that are sent or received between the second aerial vehicle and the one or more additional aerial vehicles. Power can then be transmitted across or through the aerial vehicle from the one or more additional aerial vehicles through the first aerial vehicle to charge the aerial vehicle. Therefore, one aerial vehicle can be charged and have the charge be passed to other vehicles in the swarm.

A swarm of UAVs may all include customized FPGA hardware and one or more nested coils which may be implemented on a multi-layer PCB which may be adjustable on-the-fly to be aimed in different directions. This allows for real-time sensing of the relative positioning of the UAVs in the swarm and the battery of a UAV may be charged using energy hopping between UAVs, as shown in FIG. 27. One UAV, which may be able to carry a higher capacity battery than the other UAVs in the swarm to provide energy to the other UAVs. The changes in resonance coupling between active pairs of UAVs may be used for on-the-fly positioning of the UAVs without the need for GPS. Instead of passing from the power source through wired connections between coils, power may pass from a higher battery capacity UAV through the coils of multiple swarm UAVs in a path to the UAV to be charged via the same wireless energy transfer techniques as described above with respect to target device charging.

In some embodiments, kinetic energy from the propellers of the UAVs may be harvested through regeneration techniques through coupling to an electrical generator to recapture kinetic energy in the form of electric charge similar to the regenerative braking systems in many hybrid and electric cars. The recaptured kinetic energy can be used to charge the battery of the UAV or to charge the battery of other UAVs by hopping from coil to coil on different UAVs in the swarm.

The individual pads can act as a distributed charging network using the principles described above. Due to a lack of wired connections between the coils of individual UAVs in the swarm, certain features may be different than in wired coil networks. For example, power sources generally may be localized to each charging coil as opposed to centralized. Wireless communication between the individual swarm UAVs can also be utilized to provide positional, sensing, and charging information relative to both a target UAV receiving wireless charging as well as relative to additional UAVs in the swarm. Because power sources are localized to each charging UAV in the swarm and the individual swarm UAVs include sensing coils (as well as other potential sensors such as cameras, gyroscopic sensors, GPS sensors, etc.), and are in communication with each other, the battery of a UAV may be charged using energy hopping between individual charging UAVs 2702 in the swarm, as shown in FIG. 27, or via a leader or master UAV 2703, which can be a master power source to charge other UAVs, or a transmitter tower 2705 that broadcasts a charging signal across multiple UAVs.

The changes in resonance coupling between active pairs of UAVs may be used for on-the-fly positioning of the UAVs without the need for GPS. In various embodiments, flight controls during charging may be swarm-centric, receiving-UAV-centric, or some combination thereof. In order to prevent collisions and allow for precision localization for efficient charging, flight controls can be coordinated such that the UAV to be charged maintains a relatively fixed position and the swarm is formed by the swarm UAVs moving into position around the UAV to be charged. In some embodiments, the swarm may be relatively fixed during charging and the UAV to be charged may maneuver into position for efficient charging. As described above, during charging, flight controls for the UAV to be charged may be passed to the charging network in order to more easily position all of the UAVs in the process. Coordinated flight can enable charging not only in the air but on the move. As long as the UAV to be charged and the UAVs in the swarm maintain relatively fixed positioning relative to each other, their movement relative to the ground should not impact the charging operation.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. An autonomous charging pad for aerial vehicles, comprising:
   (i) a controller circuit coupled to a plurality of sensing tiles to receive a corresponding plurality of sense voltages, and is configured to determine the location or a type of aerial vehicle and each leg of the aerial vehicle based on a pattern of the plurality of sense voltages, the aerial vehicle and the legs of the aerial vehicle being either fixed or movable relative to the charging pad;
   (ii) an array of sensing tiles comprising:
      one or more driven coils to produce magnetic signals in response to drive signals;
      one or more sense coils disposed to:
         (a) magnetically couple to the one or more driven coils to receive the magnetic signal produced by the driven coils, and
         (b) produce a sense voltage as a function of its proximity to the aerial vehicle and/or each legs of an aerial vehicle; and
   (iii) an array of charging coils, the array of charging coils being one or more of inductive or resonance coils configured to deliver power to one or more aerial vehicles or each leg of the aerial vehicle, which are detected and localized by the controller circuit; and
   (iv) a power distribution circuit.

2. The charging pad of claim 1, wherein the charging pad is configured to create a plurality of electromagnetic charging fields based on the number and types of aerial vehicles.

3. The charging pad of claim 1, wherein one or more radio frequency fingerprinting algorithms are run thereon for authentication of aerial vehicles and detection of their types using wireless signals from other aerial vehicles.

4. The charging pad of claim 1, further comprising (i) one or more arrays of reconfigurable RF transceivers; and (ii) one or more reconfigurable power management circuits.

5. A device for mounting to an aerial vehicle, comprising:
   one or more charging feet adapted to be positioned on one of a plurality of legs of an aerial vehicle;
   a backpack that is associated with the aerial vehicle, the backpack being configured to run one or more algorithms thereon for authentication of signals, the backpack comprising:
      i) one or more power management circuits, each power management circuit being coupled to at least one coil in the charging feet and each power management circuit being configured to regulate the received energy into a battery-charging voltage level;
      ii) a power summation circuit that is coupled to all power management circuits to combine the power received from each of the charging feet;
      iii) a connector circuit that is coupled to power summation circuit and is connected to a battery and adapted to provide the battery-charging voltage level to a battery of the aerial vehicle;
   at least one coil included in the mechanical feet configured to receive energy from one or more external coils; and
   power management circuitry coupled to the at least one coil to regulate the received energy into a battery-charging voltage level.

6. The device of claim 5, further comprising a configurable RF transceiver that communicates with one or more aerial vehicle charging stations.

7. The device of claim 5, further comprising a main microcontroller that coordinates the operation of all components in the backpack and runs a suite of algorithms for authentication of signals transmitted by a wireless radio controller and aerial vehicle charging stations.

8. The device of claim 7, wherein the autonomous landing system uses a combination of camera, LiDAR, infrared, electromagnetic sensing and RF based localization techniques.

9. The device of claim 5, wherein the at least one coil is contained in appendages extending from a central body of the aerial vehicle.

10. A method for charging a group of aerial vehicles, the method comprising:
   sensing a location of a second aerial vehicle using a first aerial vehicle;
   directing power to the second aerial vehicle from the first aerial vehicle based on a relative location of the second aerial vehicle relative to the first aerial vehicle, wherein directing power includes directing electromagnetic energy fields;
   receiving the power in the second aerial vehicle; and
   charging a battery of the second aerial vehicle with the power received.

11. The method of claim 10, wherein one or more of the first and second aerial vehicles are each comprised of a plurality of resonant coils and a controller circuit.

12. The method of claim 10, wherein the controller circuit is coupled to each resonant coil of the plurality of coils to receive a corresponding plurality of sense voltages, and is configured to detect the other aerial vehicles based on a pattern of the plurality of sense voltages.

13. The method of claim 10, wherein sensing the location of the second aerial vehicle relative to the first aerial vehicle further comprises sending or receiving wireless signals from one or more of the first and second aerial vehicles to determine their relative location.

14. The method of claim 10, further comprising sensing a location of the second aerial vehicle from one or more additional aerial vehicles and directing the power destined for the second aerial vehicle from the one or more additional aerial vehicles through the first aerial vehicle.

15. The method of claim 10, wherein the location of the second aerial vehicle from the one or more additional aerial vehicles is sensed via a change of electromagnetic field or sensed voltage of one or more of the resonant coils that are sent or received between the second aerial vehicle and the one or more additional aerial vehicles.

16. The method of claim 10, wherein the location of the second aerial vehicle from the one or more additional aerial vehicles is sensed via radio frequency signals that are sent or received between the second aerial vehicle and the one or more additional aerial vehicles.

17. The method of claim 10,
   wherein a controller circuit in each aerial vehicle has configurable impedance of resonant coils in each aerial vehicle, and
   a master controller in one or more master aerial vehicles, communicatively coupled to all controller circuits in of the plurality of aerial vehicles, and configured to:
      select a subset of the plurality of aerial vehicles, excluding some of the plurality of aerial vehicles, to define an electromagnetic power path from the master aerial vehicles to other aerial vehicles in proximity to a cluster of one or aerial vehicles; and
      control the power source configurations in each mater aerial vehicles and respective impedance of resonant coils of the subset of aerial vehicles to form a chain of wireless magnetic resonance power transmission from the master aerial vehicles to other aerial vehicles.

18. The system of claim 17, wherein each master aerial vehicle has a resonant coil that is coupled with a reconfigurable amplifier circuit.

19. The system of claim 18, wherein one or more configurable variables of each reconfigurable amplifier circuit is coupled, and configured with, a microcontroller.

20. The system of claim 18, wherein, when the control commands are sent to the plurality of aerial vehicles, each aerial vehicle having a radio frequency transceiver to receive and send control messages to make a control wireless mesh network.

* * * * *